United States Patent [19]

Ichikawa et al.

[11] Patent Number: 5,778,512
[45] Date of Patent: Jul. 14, 1998

[54] MANUFACTURING METHOD FOR A ROTOR OF AN ELECTRIC ROTARY MACHINE

[75] Inventors: Hideki Ichikawa, Inazawa; Masahiro Takada, Okazaki; Kouji Katahira, Chiryu; Keniti Shibayama, Anjo, all of Japan

[73] Assignee: Nippondenso Co., Ltd., Kariya, Japan

[21] Appl. No.: 574,033

[22] Filed: Dec. 18, 1995

[30] Foreign Application Priority Data

Dec. 19, 1994 [JP] Japan .................... 6-315325
Dec. 19, 1994 [JP] Japan .................... 6-315336
Oct. 26, 1995 [JP] Japan .................... 7-279346

[51] Int. Cl.⁶ .................................................. H02K 15/06
[52] U.S. Cl. ........................ 29/598; 310/42; 310/201
[58] Field of Search ................. 29/598, 596; 310/200, 310/201, 42, 45, 208

[56] References Cited

U.S. PATENT DOCUMENTS 5,211,670  5/1993  Ohmi et al. .
5,266,858  11/1993  Ohmi et al. .
5,508,577  4/1996  Shiga et al. .................... 310/201

FOREIGN PATENT DOCUMENTS 2 534 085  4/1984  France .

*Primary Examiner*—Carl E. Hall
*Attorney, Agent, or Firm*—Cushman Darby & Cushman IP Group of Pillsbury Madison & Sutro LLP

[57] ABSTRACT

A rotor for an electric rotary machine having an armature core, upper layer coil elements and lower layer coil elements is provided. Each coil element has a straight coil side and a pair of coil ends extending radially at a right angle from the coil side. Each coil end is inclined by a predetermined angle with respect to the coil side in a circumferential direction of the armature core. The lower layer coil side and the upper layer coil side are inserted into corresponding slots in a radial direction. A connector comprising a tip of the coil end of the upper layer coil element and a connector comprising a tip of the coil end of the lower layer coil element are welded together.

19 Claims, 25 Drawing Sheets

F I G. 35
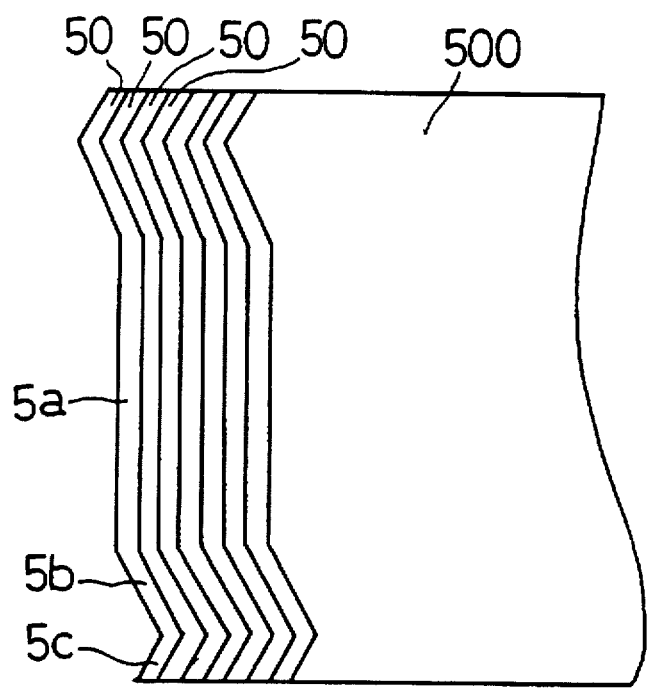
F I G. 36
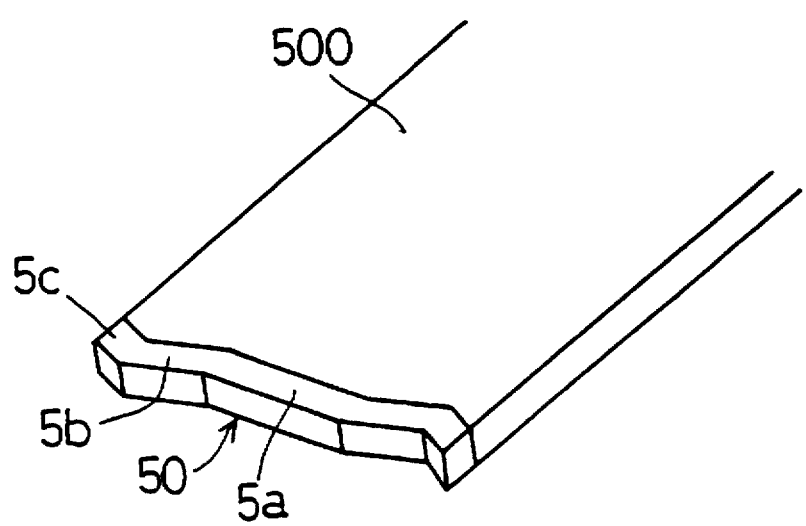

५,७७८,५१२

MANUFACTURING METHOD FOR A ROTOR OF AN ELECTRIC ROTARY MACHINE

BACKGROUND OF THE INVENTION

1. Field of the Invention

This invention relates to a method for manufacturing a rotor of an electric rotary machine. The rotor is equipped with a commutator having a substantially disc-shaped coil end.

2. Description of Related Art

In a conventional method for manufacturing a rotor for an electric motor, as disclosed in Japanese Patent unexamined Publication No. 60-226755, a straight conductive wire is first eccentrically bent at a substantially center position of the wire to form a pine needle shaped conductive wire having a bent portion and first and second straight portions. The bent portions of a necessary number of the pine needle shaped conductive wires are then extended radially in a jig by placing a projecting side, projected due to the eccentricity of each bent portion, to be inside. The jig is rotated such that the first and second straight portions of each conductive wire are relatively coaxially rotated by a first prescribed angle in one direction to broaden an inner circumference of a circle trace depicted by the arrangement of the bent portions. While the inner circumference of the circle trace is regulated and while the tops of the bent portions are pushed, the first and second straight portions are relatively coaxially rotated by a second predetermined angle larger than the first prescribed angle in the other direction (the reverse direction), thereby forming a first flat portion, a second flat portion, and a gap therebetween on the bent portion. Subsequently, all the conductive wires formed in the prescribed shape are inserted into corresponding slots opened on a core of an armature from an end of the slot in a core's axial direction so that the first and second straight portions of the same conductive wire are placed in alternate slots and that the first and second straight portions of different wires are placed in the same slot on outer and inner sides, respectively, in a radial direction. A commutator having plural segments on the outer round surface is secured on the shaft of the core, and the first and second straight portions drawn from different slots are coupled to the corresponding segment of the commutator.

This well known commutator is constructed from a plurality of conductive segments and an insulating resin member for securing the segments having a hole at the center thereof. The commutator is secured by inserting the shaft of the core of the armature with pressure into the hole of the resin member. After conductive wires covered with a coating are inserted into grooves formed on the respective segments of the commutator, the coating of the wire is melted by a fusing process, thereby coupling the segment with the conductive wire having the coating melted, i.e., with the connection of the first and second straight portions.

With this conventional manufacturing method in order to couple the respective segments of the commutator with the first and second straight portions which are drawn from different slots after the conductive wires having the first and second straight portions are inserted into the slots of the core of the armature in the core's axial direction, the first and second straight portions projecting from the slots must be first cut in a prescribed length and be inclined or twisted, while being bent toward ends in the axial direction of the core, by a prescribed angle in a circumferential direction of the core. Therefore, it is difficult to precisely transform the projecting first and second straight portions into a coil shape.

SUMMARY OF THE INVENTION

It is an object of the invention to provide a method for manufacturing a rotor of an electric rotary machine, such as an electric motor, capable of precisely forming a coil projecting from a core of an armature.

According to a method for manufacturing a rotor of an electric rotary machine, an upper layer coil element having a pair of upper layer coil ends electrically connected at both ends of the upper layer coil side in extending with a right angle from the upper layer coil side and inclined by a predetermined angle with respect to the upper layer coil side in a circumferential direction of an armature core, and a lower layer coil element having a pair of lower layer coil ends electrically connected at both ends of the lower layer coil side in extending with a right angle from the lower layer coil side and inclined by a predetermined angle with respect to the lower layer coil side in a circumferential direction of the armature core are formed. The lower and upper layer coil elements are inserted into the corresponding slots of the armature core from the outer round surface in a radial direction of the armature core, and then, a connector of the upper layer coil end inserted in one of the slots is coupled with another connector constituted of a tip of the lower layer coil end of the lower layer coil element inserted in another one of the slots. As a result, it is unnecessary to conduct a process in which, after the coils are inserted into slots of the armature core, the projecting portion of the coil from the slot is trimmed down to a predetermined length, and the trimmed coil is inclined by a predetermined angle in a circumferential direction of the armature core in being bent toward the end in the axial direction of the armature core, or a complicated, linearly twisting process. That is, the projecting portion of the coil can be made in the precise shape.

The coil elements formed at regions to be formed are simply inserted from the outer round surface in the radial direction of the armature core, and only both connectors are coupled to complete assembling of the coil elements, so that this method can improve significantly assembling efficiency.

According to a preferred embodiment, no process except for the process in which the inner disc shaped insulators, the lower layer coil ends, and the outer disc shaped insulators are sequentially cumulated and assembled on both ends of the armature core can surely eliminate defective connections occurring between the lower layer coil element and the armature core at the ends (coil ends) of the armature core and occurring between the lower layer coil element and the upper layer coil element. It would be unnecessary to be equipped with any of preheating, coating, and baking apparatuses, which may be required for powder-coating; defective insulation from pin holes or peeling off of wire's coating due to force exerted when the wires are wound can be prevented; and simple and strong insulation structure can be obtained.

A pressing machine can be used by selecting the plate material for producing both coil elements, and upon preparation of particularized molds, both coil elements are very easily formed. Even when the cross sections of the coil elements are varied to obtain rotors having different outputs, the cross section can be freely varied by altering the width in use of the material in the same thickness, and it would be convenient to manufacture products of various kinds.

In a preferred embodiment, after the conductive plate is fed by a constant pitch in a predetermined direction, a shape equal to the edge shape of the extended body of the coil conductor is cut to obtain the extended body of the coil conductor, and the coil sides and coil ends are formed by bending both ends of the extended bodies. Even when extended bodies of narrow coil conductors are formed, this method can provide good productivity through readily processing and further improve the yield (rate of usage) of the material significantly.

Feeding a conductive plate can be done by a different pitch. The conductive plate is fed in a predetermined direction by a constant pitch twice or more of the width of the coil conductor forming the lower layer coil elements. The extended bodies of the coil conductor are punched off from a foregoing portion of the conductive plate. Subsequently, additional extended bodies from a remaining portion are formed by cutting off the ends in the crosswise direction of the remaining portion of the conductive plate located adjacently to the punched extended body, and the coil conductor is formed by bending both ends of the extended bodies. Since new extended bodies of the coil conductor can be formed using the remaining portion of the conductive plate, this method can significantly improve the yield of the conductive plate.

When the conductive plate is punched off so that the lower layer coil end is narrower than the lower layer coil side, after the extended body is punched off, the conductive plate is punched off so that a portion to be the lower layer coil end is narrower than a portion to be the lower layer coil side, at the same time or before the ends in the crosswise direction of the remaining portion of the conductive plate are cut off. Since the punching mold does not have to be narrow even when the lower layer coil end is narrower than the lower layer coil side, warp, stress, and burr are prevented, and the life of the punching mold is not shortened.

In another preferred embodiment, a rectangular bar having a predetermined length required to form plural extended bodies of the coil conductor forming the upper layer coil elements or the lower layer coil elements, is prepared. Subsequently, a narrow portion is formed at the outer periphery of the rectangular bar at every predetermined interval in the axial direction of the rectangular bar to form plural extended bodies, and the upper layer coil ends or the lower layer coil ends are formed by bending both ends of the respective extended bodies. This method can improve the yield of the material greatly.

In another aspect of the invention, since the slot inner insulators have the U-shaped cross section, the lower layer coil elements, the slot inner insulators have the U-shaped cross section, and the upper layer coil elements are cumulated in this order into the slots, the lower and upper slot inner insulators can be inserted from the same direction, as well as the upper and lower layer coil elements. The armature core is therefore assembled easily. This method can surely eliminate defective connections occurring between the lower layer coil element and the armature core at the ends (coil ends) of the armature core and occurring between the lower layer coil element and the upper layer coil element. It would be unnecessary to be equipped with any preheating, coating, and baking apparatuses, which may be required for powder-coating; defective insulation from pin holes or peeling off of wire's coating due to force exerted when the wires are wound can be prevented; and simple and strong insulation structure can be obtained.

According to yet another embodiment, the respective upper layer coil elements and the respective lower layer coil elements are attached in the slots all at once, so that the coil elements serve as guides for one another, so that the coil ends of the coil elements adjacent to each other and the coil ends of the coil elements to be attached do not interfere with each other to disturb the attachment, and so that the coil elements are easily attached. Since all the coil elements are assembled at one time, this method can bring, as a matter of course, very high productivity, thereby enabling to manufacture a large amount of rotors with less costs. Such coil elements can be inserted into the slots piece by piece, thereby enabling an inserting apparatus to be simple. The insertion of the coil element of a second time or more may be conducted in rotating the coil element in a predetermined rotary direction to make the insertion.

According to a further embodiment, insertion of coil groups can be conducted in a single direction, and therefore, the inserting apparatus can be simplified, since the lower layer coil elements and the upper layer coil elements are divided into the plural coil groups; each coil group is inserted into the corresponding slot; the armature core is rotated; and then, the next coil group is inserted in the slot. That is, the attachments of the coil elements can be conducted manually or by using simple jigs without any special apparatus to attach the coil groups at one time, so that this attaching method can be ideal for production of a small or middle amount.

In the preferred embodiment, the armature core is rotated, and connectors are welded piece by piece. Therefore, even a simple apparatus can perform welding automatically. It is to be noted that it is preferable to use the TIG (Tungsten-Insert Gas) welding. That is, when the TIG welding is used, a continuous welding, as well as high speed welding, can be performed. Since it is unnecessary to provide the welding electrode for each slot and to position the workpiece in the rotary direction, the welder can be simplified and obtained with less costs. Since such welding is a non-contact type, the torch is rarely impaired, and the welding can be performed with great economical advantages.

Projections may be formed to narrow the slot opening. Use of two type punches having different widths can plastically deform the projections of the armature core in the different ways. The outer size of the armature core can be maintained with high precision, and the projections can be fallen easily. The opening of the slot is surely narrowed by deformations of the projections.

A pressing body movable in an axial direction having a flat pressing surface may be used for smoothing the surface of the workpiece. The commutator surface is merely pushed without more, so that widely used, simple and inexpensive pressing machines can be used to realize such smoothing process.

According to still further embodiment, a solidified resin portion may be used to connect the upper layer coil elements. The solidified resin portion is made from a liquid resin. When the solidified resin portion is formed, the deviations of positions are fixed, thereby reinforcing the rigidity. The liquid resin, which is easily handled, is dropped near the regions of the upper layer coil ends to be reinforced, is made to permeate into space between the upper layer coil ends utilizing the permeant nature of the liquid, and is further rotated, thereby being unified, enabling to remove unnecessary liquid resin, enabling to constitute necessary insulation layers with the minimum liquid resin to be required, and further enabling the corrected liquid resin to be used again.

In another embodiment, since the solidified resin portion can be removed by the cutter, where the surface of the upper layer coil ends is the commutator surface, undercutting grooves can be formed easily. In use of multiple cutters, processing time may be reduced.

BRIEF DESCRIPTION OF THE DRAWINGS

The above and other objects and features of the invention become apparent to those skilled in the art from the following preferred embodiments thereof when considered in conjunction with the accompanied drawings, in which:

FIG. 35 is a plan view showing a conductive plate from which the lower layer coil elements are cut;

FIG. 36 is a perspective view showing a conductive plate from which the lower layer coil elements are cut;

DETAILED DESCRIPTION OF THE PREFERRED EMBODIMENTS

[First Embodiment]

Figure 1:
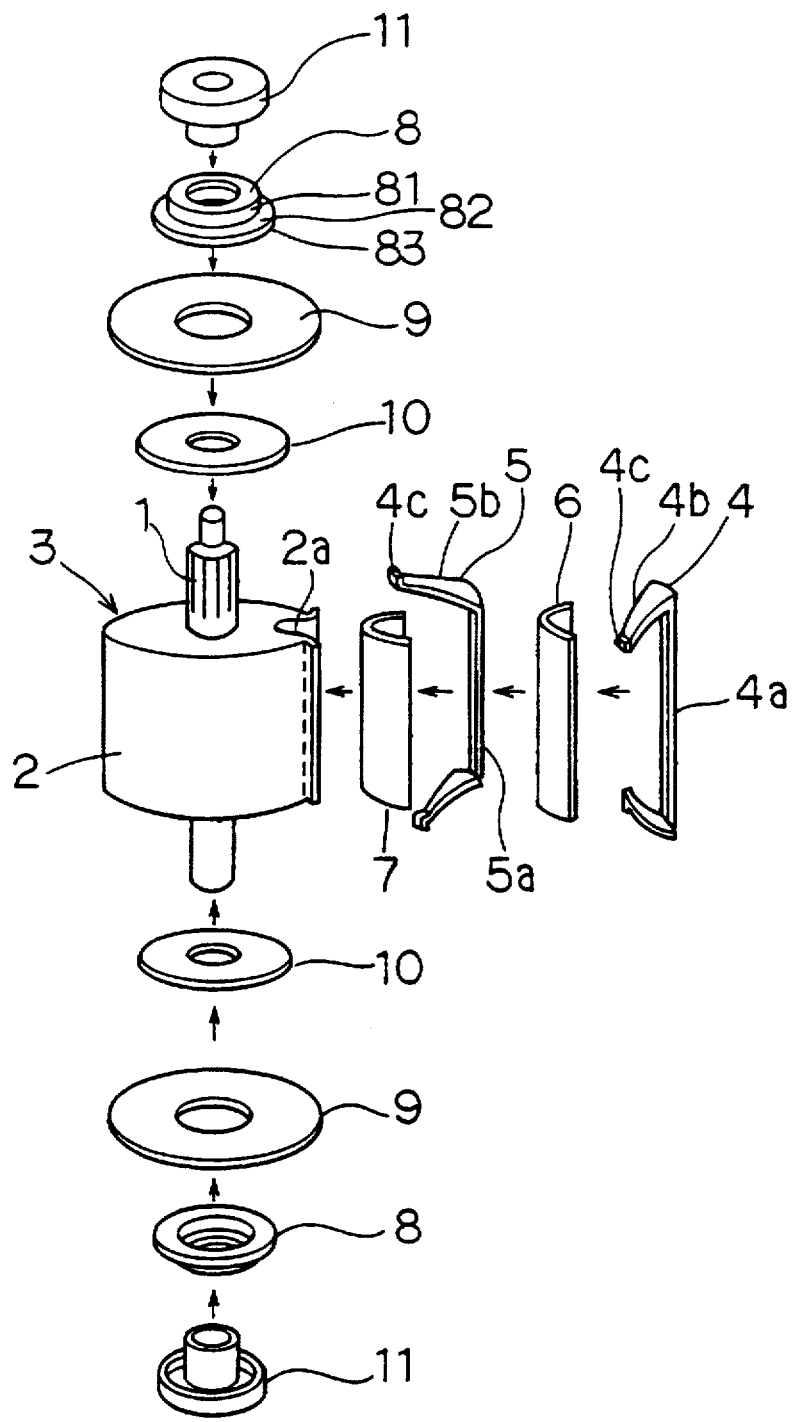
FIG. 1 is an exploded perspective view showing the assembled state of a rotor of the first embodiment according to the invention.

Referring to the drawings in detail, in particular, to FIG. 1, a rotor of an electric motor as an electric rotary machine according to a first preferred embodiment of the invention is shown. FIG. 1 is an exploded perspective view showing the rotor, illustrating the assembly thereof. The rotor 3 is formed of a lamination core (armature core) 2, comprising stacked multiple thin steel sheets which are respectively made in a disc shape by punching off a thin steel plate, and a shaft onto which the lamination core 2 is fitted and secured. Slots 2a in a predetermined number are formed on an outer round surface of the lamination core 2 with a constant interval therebetween.

Figure 3A:
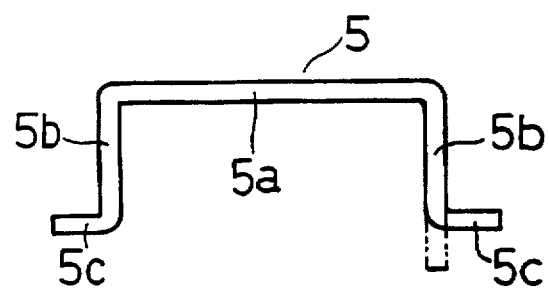
FIG. 3(a) is a side view showing a lower layer coil element.
Figure 3B:
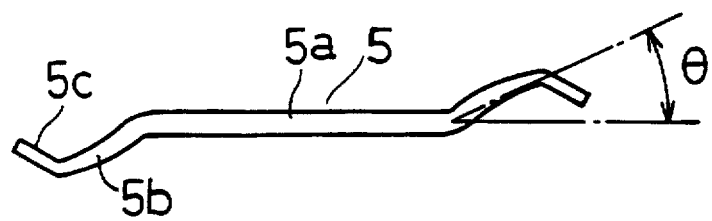
FIG. 3(b) is a view showing the expanded lower layer coil element shown in FIG. 3(a)
Figure 4A:
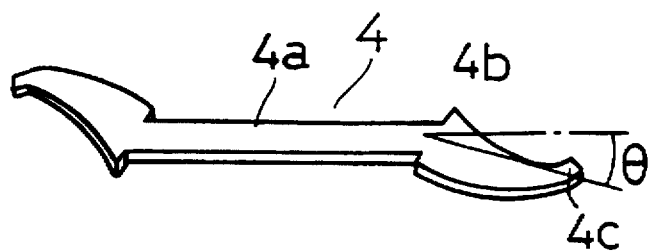
FIGS. 4(a), 4(b), and 4(c) are perspective views showing an upper layer coil element.
Figure 4B:
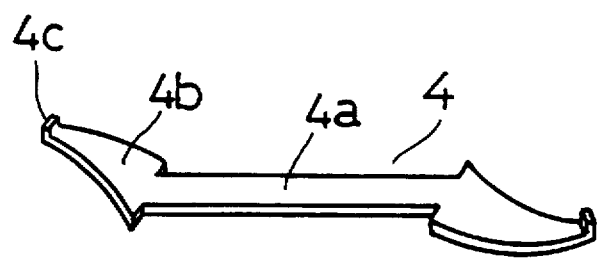
Figure 4C:
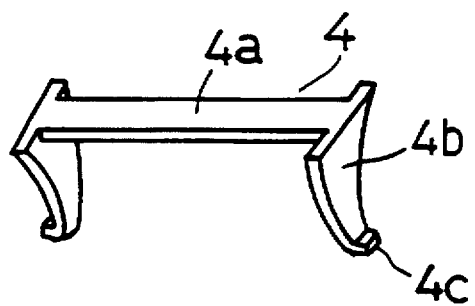

FIG. 3(a) shows a side view of a lower layer coil element 5; FIG. 3(b) shows an extended diagram of the element 5; and FIGS. 4(a) to 4(c) show the shape of an upper layer coil element 4. Because the upper layer coil element 4 has a shape substantially the same as the lower layer coil element 5, the lower layer coil element 5 is exemplified to explain the shape of those elements.

The lower layer coil element 5 comprises a lower layer coil side 5a in a straight shape located in a middle position of the element, a lower layer coil end 5b extending from each end of the coil side 5a, and a connector 5c (tip) further extending from each extended end of the lower layer coil ends 5b. The lower layer coil end 5b has, in the extended form thereof, a predetermined twisted angle θ with respect to a longitudinal or extending direction of the lower layer coil side 5a. The connector 5c is a part to be coupled with a connector 4c of the upper layer coil element 4 as described below. The connector 5c also has, in the extended form thereof, a predetermined twisted angle with respect to a longitudinal or extending direction of the lower layer coil side 5a. As shown in FIG. 3(a), the lower layer coil end 5b is bent by a right angle from the lower layer coil side 5a and bent as a whole in a U-shape; the connector 5c is outwardly bent in substantially parallel to the lower layer coil side 5a.

The upper layer coil element 4 has a shape substantially same as the lower layer coil element 5, and similarly, the upper layer coil element 4 has an upper layer coil side 4a, a pair of upper layer coil ends 4b, and a pair of connectors 4c. The tips of the connectors 5c and 4c are designed to have size and angle to match with each other when assembled on the armature core 2, as shown in the cross section in FIG. 2.

A method for manufacturing the upper layer coil element 4 and the lower layer coil element 5 will be described as follows. FIGS. 4(a) to 4(c) are schematic perspective views showing a manufacturing method of the upper layer coil element. Since the lower layer coil element 5 has the shape substantially the same as the shape of the upper layer coil element 5, only the manufacturing of the upper layer coil element 4 is described below.

A flat material plate, such as an electrically conductive copper plate, is forced to pass between rollers aligned vertically to straighten or flatten warps occurring on the flat plate. The straightened plate is subjected to a punching process in which the extended forms of the conductive body are punched out by pressing as described below, and the extended bodies in the shape shown in FIG. 4(a) are punched out of the copper plate. The extended body comprises, as described above, the upper layer coil side 4a, the upper layer coil ends 4b, and the connectors 4c. One of the upper layer coil ends 4b is to be used for a commutator. The thickness of the plate is approximately 1 millimeter or more. The connectors 4c of the extended body are bent by about ninety degrees as shown in FIG. 4(b), and subsequently, portions located at a predetermined distance away from the connectors 4c are also bent by about ninety degrees as shown in FIG. 4(c). The upper layer coil end 4b, as shown in FIG. 4(a), obliquely extends by the angle θ with respect to the upper layer coil side 4a on a plane of the extended body. The connector 4c also, as shown in FIG. 4(a), obliquely extends by the predetermined angle with respect to the upper layer coil end 4b on the plane of the extended body. It is to be noted that the process for bending the connector 4c can be conducted after the process for bending the upper layer coil ends 4b.

Figure 9:
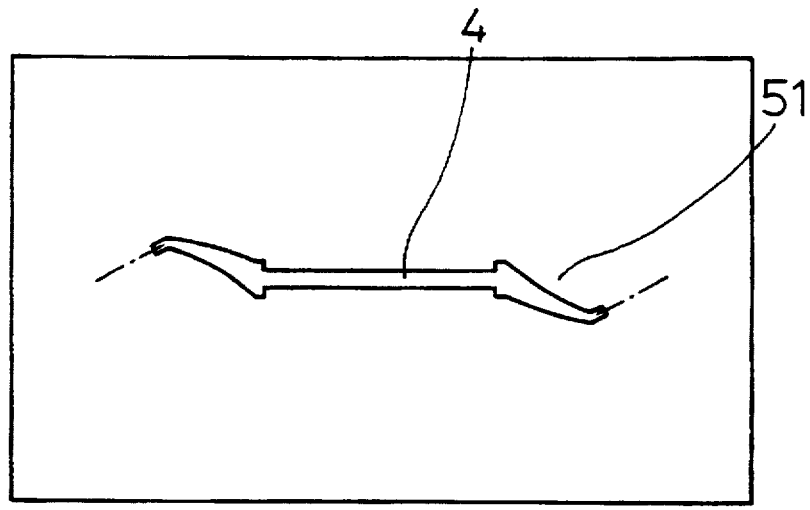
FIG. 9 is a plan view showing a die for punching expanded forms for the lower layer coil elements.

FIG. 9 shows a mold used for punching out the upper layer coil elements 4. The numeral 51 is a die for punching. The material plate located between the die 51 and the mold is punched out by the mold in substantially the same shape as the shape of the extended body of the upper layer coil element 4. In a conventional technique, it was extremely difficult to completely straighten the twist of wires because the armature coil made of a copper wire is purchased from some material manufacturer in a state that each wire has been wound and therefore such twist tends to remain in the material. When the wire with twist is used to form the conductive body, however, such twist adversely affects and impairs size precision such as bend angles of the products, and it is difficult to solve such problems. By comparison the plate material of this embodiment is used, though the plate material may have defects such as warps in the winding direction and variations in plate thickness from the nature of plate materials, the variation of the material thickness rarely affects bend angles and the flattening or straightening rollers are able to correct the warps in the winding direction, so that the conductive bodies can be obtained with high accuracy in the form thereof. Since the plate material is punched off, the cross-sectional shape of the conductive body becomes about rectangular, and therefore, an occupancy rate around the armature can be significantly improved.

Figure 10:
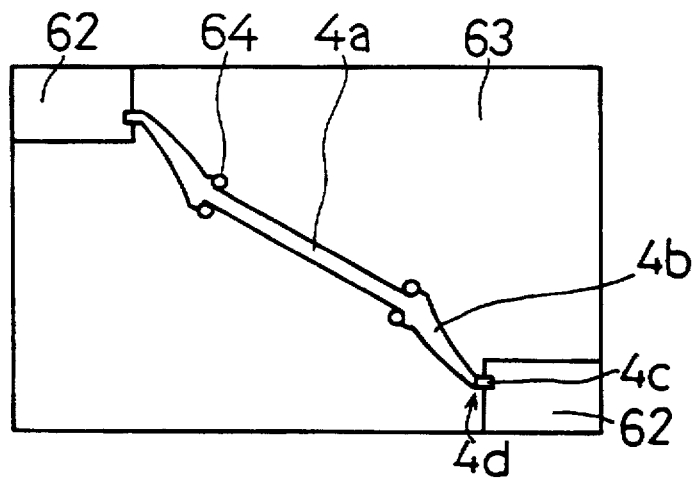
FIG. 10 is a plan view showing a lower mold half of a mold for bending process to which the upper layer coil element is set.
Figure 11:
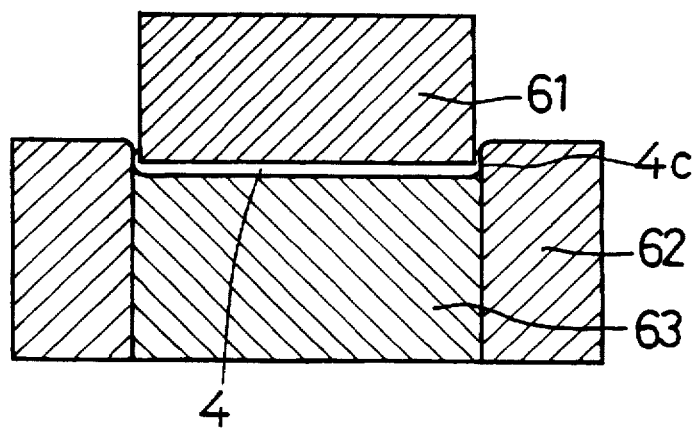
FIG. 11 is a cross section showing the mold for bending process where a connector of the upper layer coil element is bent.

Referring to FIGS. 10 and 11, the bending process for the connectors 4c shown in FIG. 4(b) is described below. FIG. 10 is a plan view showing a lower mold half 63 of a mold for the bending process to which the upper layer coil element 4 is set; FIG. 11 is a cross section showing the mold for the bending process where the upper layer coil element 4 is bent to form the connector 4c.

As shown in FIG. 10, the straightened plate is set so that the outer edge of the upper layer coil side 4a is engaged with four setting members 64 formed on the lower mold half 63. Then, an upper mold half 61 shown in FIG. 11 is disposed on the plate. While the plate is set between the upper mold half 61 and the lower mold half 63, the upper and lower mold halves 61 and 63 are moved down along the guide blocks 62 placed at the outer periphery of the lower mold half 63, thereby bending the plate to form the connectors 4c of the upper layer coil element 4.

The clearance between the guide block 62 and the upper mold half 61 is designed to be less than the original thickness of the plate for the original of the upper layer coil element 4, thereby making the thickness of the connectors 4c thinner than the original thickness. The thinner thickness of the connectors makes the connector's thermal capacity smaller and reduces necessary thermal energy to complete the connections, so that the welding work can be done quickly with low costs, as well as done easily.

Figure 12:
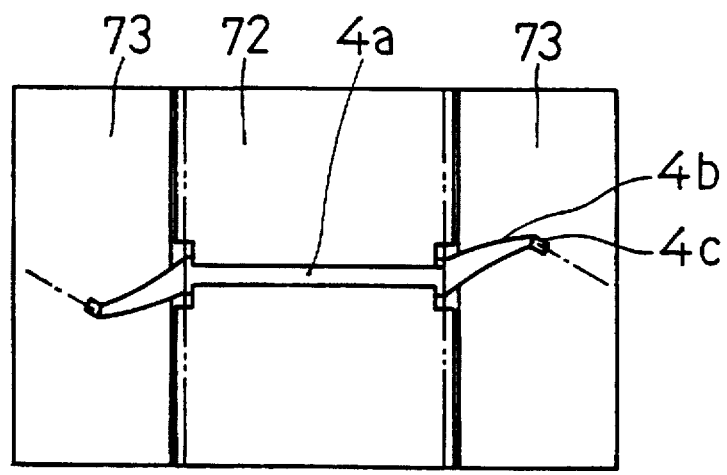
FIG. 12 is a plan view showing the lower mold half of the mold for bending process to which the upper layer coil element is set in order to bend the upper layer coil ends of the upper layer coil element.
Figure 13:
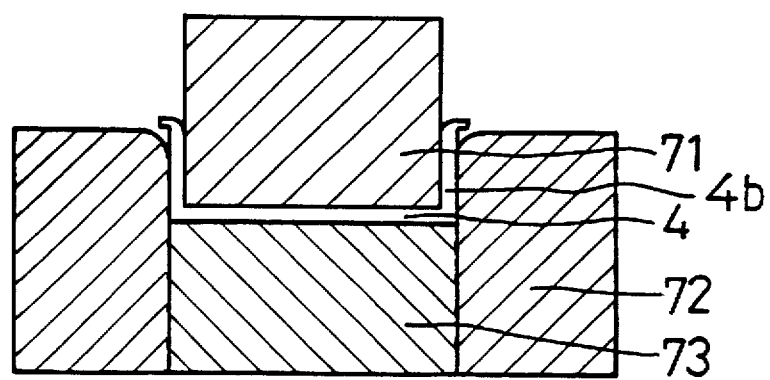
FIG. 13 is a cross section showing the mold for bending process where the upper layer coil ends of the upper layer coil element are bent.

Referring to FIGS. 12 and 13, the bending process of the upper layer coil ends 4b shown in FIG. 4(c) is described. FIG. 12 is a plan view of the mold for the bending process where the upper layer coil element 4 is set to the lower mold half 73 to bend the conductive body; FIG. 13 is a cross section of the mold for bending process where the upper layer coil ends 4b of the upper layer coil element 4 are bent.

During this bending process, an upper mold half 71, guide blocks 72 serving as the mold for bending process, and a lower mold half 73 are used. As shown in FIG. 12, the upper layer coil element 4 in which the connectors 4c thereof have already been bent is brought on the lower mold half 73 and then set between the upper mold half 71, not shown, and lower mold half 73. As shown in FIG. 13, the upper and lower mold halves 71 and 73 are moved down along the guide blocks 72 placed at the outer periphery of the lower mold half 73 to bend the upper layer coil ends 4b of the upper layer coil element 4. It is to be noted that the bending process of the upper layer coil end 4b may be conducted precedingly to the bending process of the connector 4c, or both can be conducted with the same mold.

Figure 5:
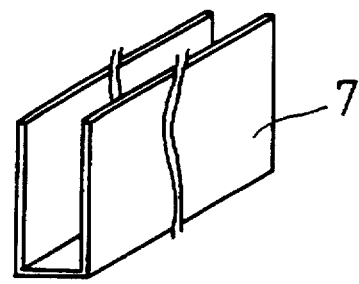
FIGS. 5 and 6 are perspective views showing slot inner insulators, respectively.
Figure 6:
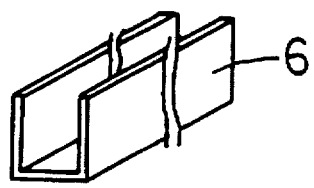
Figure 7:
FIG. 7 is a perspective view showing an inner disc insulator.

Prior to the description of this process, members to be used during this process are described as follows. FIG. 5 is a perspective view showing a slot inner insulator 7 for a lower side; and FIG. 6 is a perspective view showing a slot inner insulator 6 for an upper side. The slot inner insulator 6 for the lower side is formed by cutting or punching off a resin insulation film into a predetermined shape and subsequently bending the shape into a U-shape in cross section or by molding resin material into a predetermined shape. The insulator 7 has a height of a predetermined size higher than the depth of a slot 2a of the armature core 2. The slot inner insulator 6 is made in substantially the same manner as the slot inner insulator 7. An inner disc shaped insulator 10 is, as shown in the perspective view of FIG. 7, made of resin insulation plate extending annularly and formed by cutting, punching, or resin molding. The inner disc shaped insulator 10 is placed between the armature core 2 and the lower layer coil end 5b. An outer disc shaped insulator 9 is placed between the upper layer coil end 4b and the lower layer coil end 5b. It is to be noted that the outer disc shaped insulator 9 and the inner disc shaped insulator 10 are not necessarily made of the same material and can be made of any electrically insulating materials, for example, paper, plastic, tape containing glass, or the like.

Figure 8:
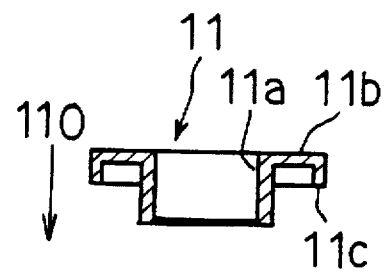
FIG. 8 is a cross section, cut in an axial direction, showing a reinforcement member.

FIG. 8 shows a reinforcement member 11. The reinforcement member 11 is made of a highly rigid body such as metal or resin and is constituted of an inner cylinder 11a, a flange 11b extending annularly from the end of the cylinder 11a, and an outer cylinder 11c extending coaxially with the inner cylinder 11 from the radially outermost edge of the flange 11b.

As shown in FIG. 1, an insulating ring 8 is used when the reinforcement member 11 is made of a conductive material and is a ring-shaped member made of thin thickness resin material having insulating nature. The insulating ring 8 is constituted of an inner annular plate 81, a cylinder 82 axially extending from the outer edge of the inner annular plate 81, and a flange 83 extending radially outwardly from the end of the cylinder 82.

The insulating process for the rotor 3 and the assembling process thereof are made as follows. First, a pair of the inner disc shaped insulators 10 is attached, by adhesive or an engagement, onto both ends of the rotor 3 to insulate both ends of the rotor 3. The slot inner insulators 7 are inserted into the slots 2a of the rotor 3 respectively from a radial outer side in a radial direction or in an axial direction of the rotor 3. The slot inner insulator 7 is at that time held by a jig, not shown, from the outer side in the radial direction.

Figure 14:
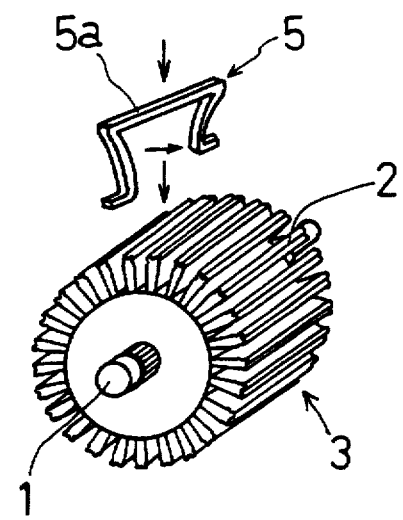
FIG. 14 is an illustrative perspective view showing an armature core with slots and a lower layer coil element to be inserted into one of the slots.
Figure 15:
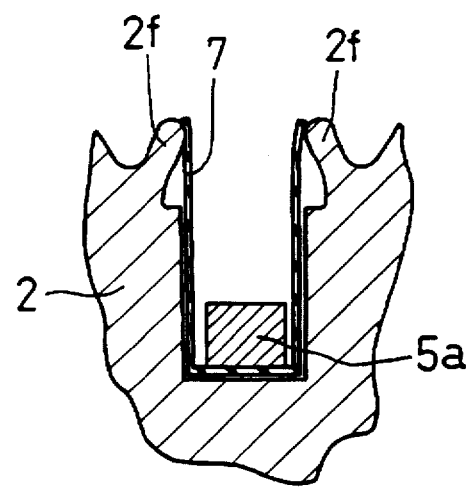
FIG. 15 is an enlarged fragmentary cross section showing the slot in which the slot inner insulator and the lower layer coil element are contained.

Subsequently, the lower layer coil elements 5 are inserted into every slot piece by piece. Referring to FIG. 14, a process for inserting the lower layer coil elements 5 piece by piece in every slot is described below. The lower layer coil elements 5 are assembled in the respective slots 2a down to the respective bottoms of the slots 2a from the outer side in the radial direction. At that time, although an assembly for the first slot can be conducted by inserting the element 5 from the outer side toward the center of the core in the radial direction while the slot 2a and the lower layer coil side 5a of the lower layer coil element 5 are positioned in parallel, assemblies for subsequent slots, since disturbed by the lower layer coil end 5b of the conductive body 5 inserted previously, can be conducted by inserting the element 5 into the slots 2a in slightly twisting the element 5 while the lower layer coil side 5a of the lower layer coil element 5 to be assembled in the slot 2a is rotated for a predetermined angle so that the extending direction of the lower layer coil side 5a serves as the center of the rotation. During insertion, the lower layer coil elements 5 are held by jigs (not shown) from the outer side in the radial direction. FIG. 15 is a fragmentary cross section showing a state in which the conductive body 5a of the lower layer coil element 5 is inserted into the slot 2a.

Figure 16:
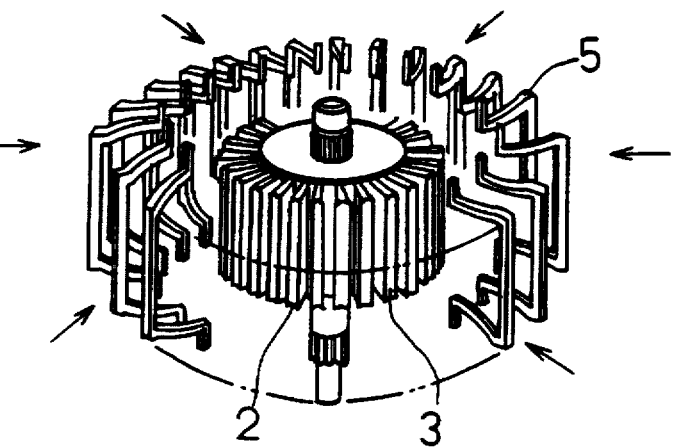
FIG. 16 is a perspective view illustrating the armature core having slots into which plural lower layer coil elements as a coil group are sequentially inserted.

Another approach to assemble the lower layer coil elements 5 is to assemble plural lower layer coil elements 5 at once. FIG. 16 shows a state in which plural lower layer coil elements 5 are inserted in the plural slots 2a, that is, coil groups, each of which is constituted of a number (for example, three) of the lower layer coil elements 5, are inserted a number of times in the following manner.

On the outer peripheral side in the radial direction of the lower layer coil element 5, disposed are jigs (not shown) having an inner round surface for holding and inserting the lower layer coil elements 5. While the jigs (not shown) are disposed to hold a predetermined number of the lower layer coil elements 5 at the outer periphery of the rotor 3, the lower layer coil side 5a of each lower layer coil element 5 is supported to be in parallel with the corresponding slot 2a. The jigs (not shown) are moved from the outer peripheral side in the radial direction toward the center of the armature core 2, thereby assembling plural lower layer coil elements 5 at the same time to the bottoms of the slots 2a.

Subsequently, the pair of the outer disc shaped insulators 9 are assembled at the same time or sequentially. As shown in FIG. 1, the outer disc shaped insulators 9 are inserted until in contact with the outer ends of the lower layer coil ends 5b of the lower layer coil elements 5. The slot inner insulators 6 thus inserted are held by jigs (not shown).

In this embodiment, the insulation process can be completed by using inexpensive uncoated or uninsulated conductors and the pressing process, or the combinations of insulation member manufactured inexpensively from plastic resin molding. This embodiment is applicable not only to conductive bodies made from a plate material but also conductive bodies made from wires or the like. The rotor 3 can be readily manufactured without skills because the rotor 3 can be assembled by stacking insulators 6 and 7 having the U-shaped cross section and the conductors 4 and 5 in a radial direction of the rotor 3. The manufacturing method, when automated, allows the automated process thereof with a simple structure and inexpensive equipments. It is to be noted that, although in this process the lower layer coil elements 5 are inserted into the slots 2a piece by piece or by a number of the coil elements 5 at a time, the lower layer coil elements 5 of a number corresponding to the entire slots 2a can be inserted at one time into the slots 2a. The upper layer coil elements 4 are inserted in similar fashion.

Figure 17:
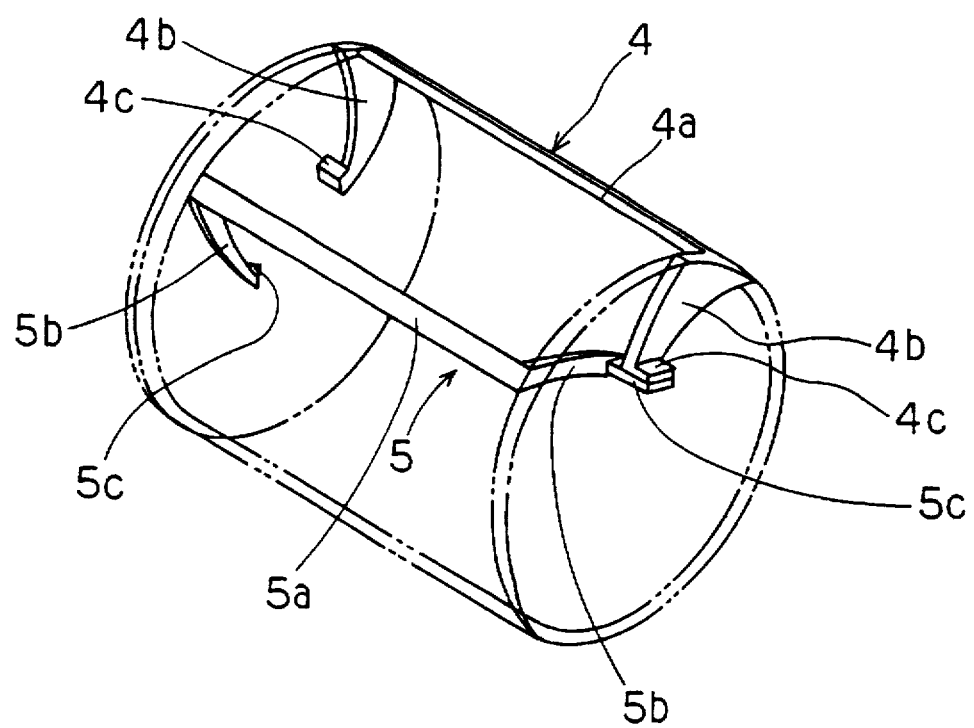
FIG. 17 is a perspective view showing an arrangement of the upper layer coil element and the lower layer coil element.
Figure 18:
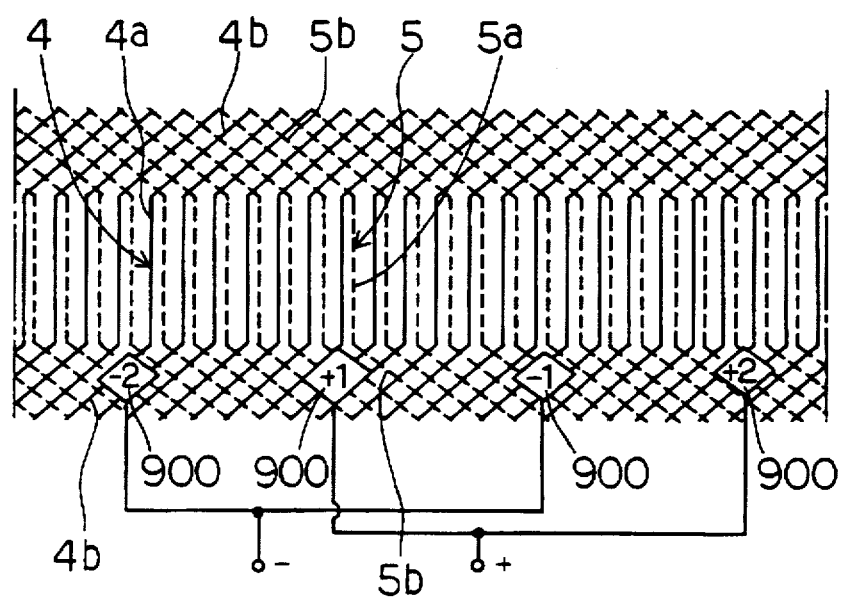
FIG. 18 is an illustration showing connections between the upper layer coil elements and the lower layer coil elements.

Next, a process for obtaining the armature structure by coupling the connectors 4c and 5c is described. As shown in a schematic perspective view in FIG. 17, the couplings between the connectors 4c and 5c are performed not by connecting the connector 4c of the upper layer coil element 4 with the connector 5c of the lower layer coil element 5 inserted in the same slot but by connecting the connector 5c of the lower layer coil element 5 with the connector 4c of the upper layer coil element 4 inserted in the different slots. FIG. 18 illustrates electrical connections between the upper layer coil elements 4 and the lower layer coil elements 5, and further shows brushes 900 arranged on an outer periphery of the upper layer coil ends 4b of the upper layer coil elements 4.

Figure 2:
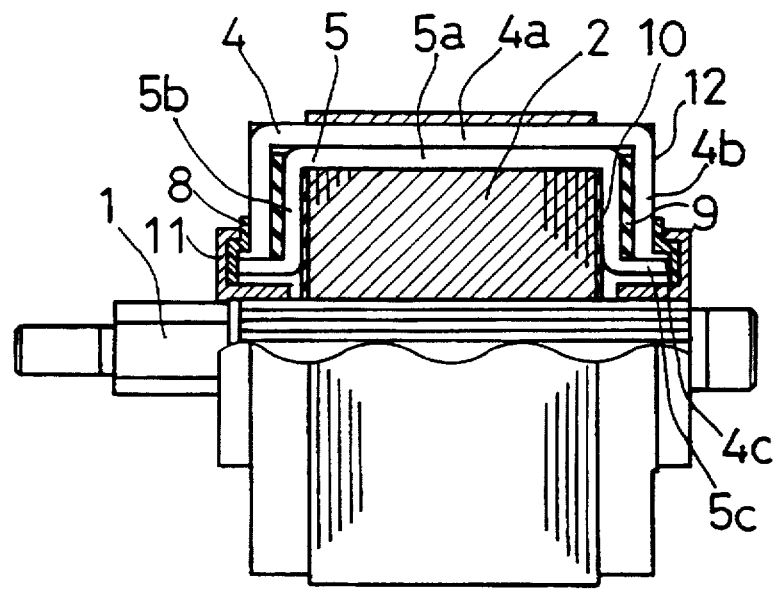
FIG. 2 is a side view, partially cross-sectioned and cut in an axial direction, of the rotor of the first embodiment.

As shown in the partial cross section in FIG. 2, the connectors 4c and 5c are overlapped in the radial direction, and the tips of the connectors 4c and 5c are continuously welded by a TIG (Tungsten-Inert Gas) welding method. Although an example of a vertical type welder is explained below, a lateral type welder may be used in which a rotary shaft for rotating a workpiece, or a combination of the rotor 3 assembled with the lower layer coil elements 5, the upper layer coil elements 5, the slot inner insulators 7, the slot inner insulators 6, the inner disc shaped insulators 10, and the outer disc shaped insulators 9.

Figure 19:
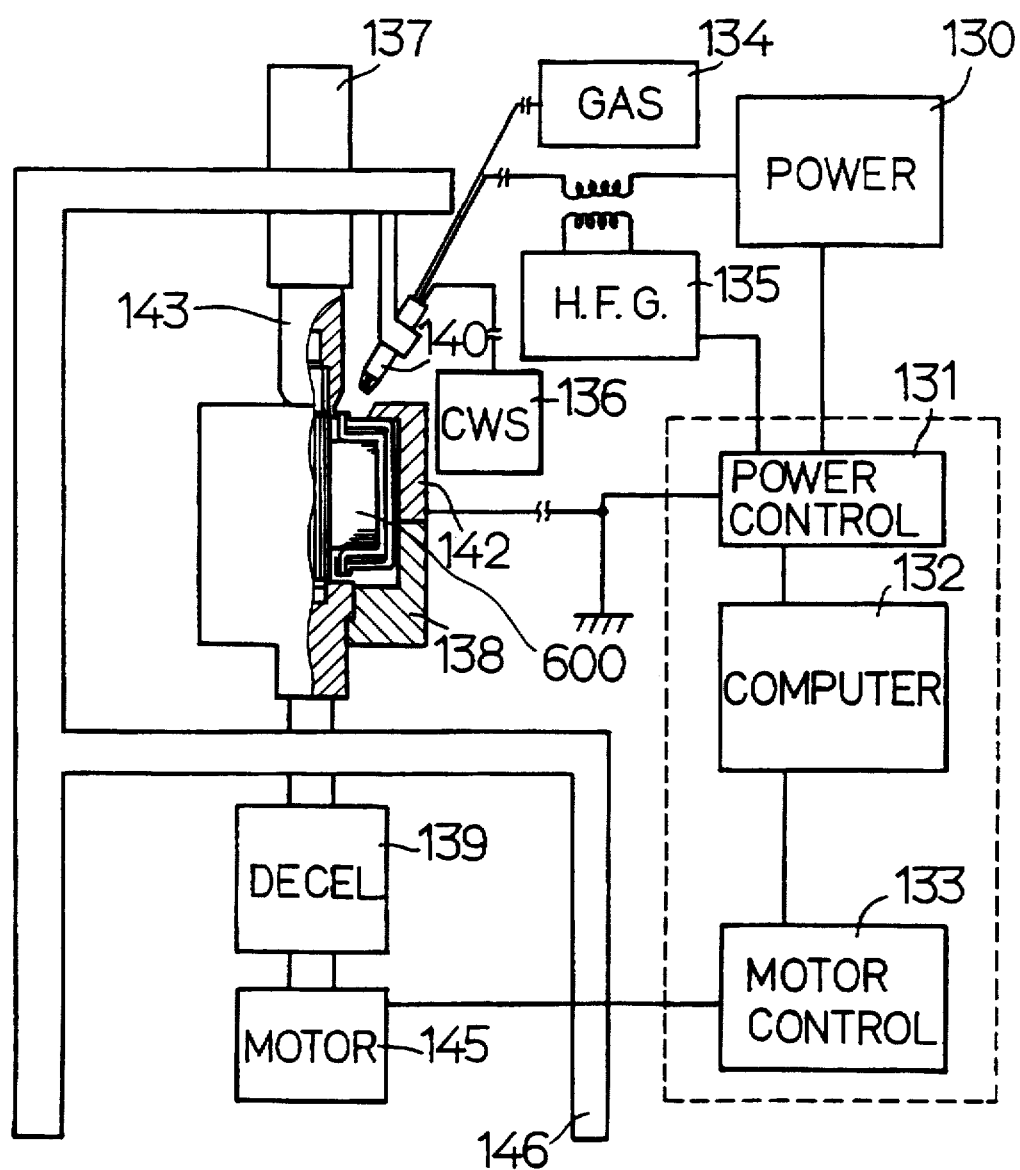
FIG. 19 is a block diagram showing a welding apparatus for welding the connectors of the upper and lower layer coil elements.
Figure 20:
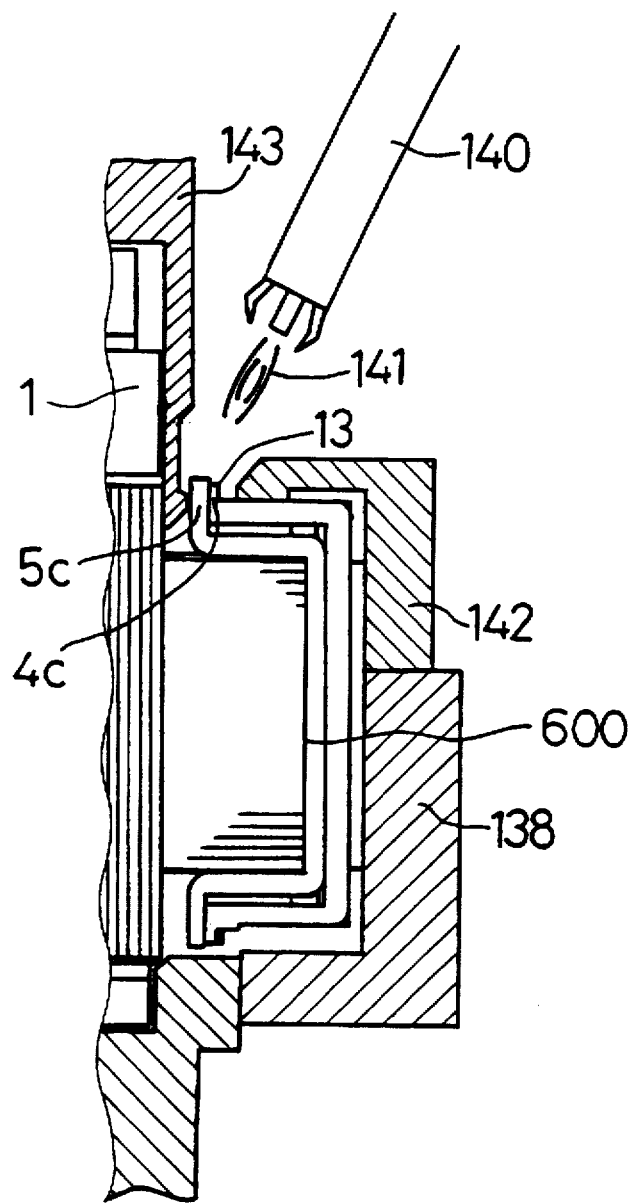
FIG. 20 is a schematic cross section showing partially the welding apparatus in FIG. 19 in the welding operation.

Referring to FIGS. 19 and 20, the construction of the welder is described. FIG. 19 is a block diagram of a welder for welding the connector 4c of the upper layer coil element 4 with the connector 5c of the lower layer coil element 5. FIG. 20 is an enlarged fragmentary cross section of the welding operation of the welder in FIG. 19.

The welder comprises a welding power source 130; a power control unit 131 for welding control to turn on and off arcs and to control power of the arcs; a computer or sequencer 132 for controlling operations; a motor control unit 133 for turning on and off a motor 145 and controlling the speed of the motor 145; a shield gas supplier 134 for supplying shield gas for stabilizing the welding condition; a high frequency generator 135 for generating a high frequency voltage required for the welding operation; a cooling water supplier 136 for circulating cooling water inside the torch; a workpiece holder 137 for holding the workpiece 600 (rotor 3) capable of pursuing the rotation of the workpiece 600; another work holder 138 for rotating the workpiece 600 in holding the workpiece 600; a decelerator 139; a torch 140 for providing an arc 141; a cooling jig 142 for the ground and the upper layer coil elements; a cooling jig 143 for the lower layer coil elements; and a base 146.

Referring to FIG. 20, the detail of the welded portion is described. Numeral 13 is a portion to be welded, or a portion at which the tips of the upper and lower layer coil elements 4 and 5 are overlapped. The workpiece 600 is held by the cylindrical work holder 138 and is driven at a predetermined speed. The torch 140 of the TIG welding is constituted of a tungsten electrode, a coolant passage, and a nozzle for the shield gas. The arc 141 is produced from the tip of the torch 140, and the welded portion 13 is melted, cooled, and thereby coupled by the thermal energy of the arc. The cooling jig 142 for cooling the ground and the upper layer coil elements 5 can prevent the workpiece 600 except for the welded portion 13 from being welded by covering the workpiece 600 around the welded portion 13.

The cooling jig 143 for the lower layer coil elements is inserted between the shaft 1 and the tip of the lower layer coil element 5. The cooling jig 143 pushes the tips, or the connectors 5c of the lower layer coil elements 5 outwardly in the radial direction, thereby getting rid of the space between both connectors 4c and 5c of the upper and lower layer coil elements 4 and 5, and holding the welded portion stably. The workpiece 600 is rotated at the predetermined rotary speed by the motor 145 together with the cooling jig 143 for the lower layer coil elements, the cooling jig 142 for cooling the ground and the upper layer coil elements, and the work holder 138. Although the torch 140 is supported on the base 146, the position, orientation, and the like of the tip may be changed and adjusted depending on the shape of the welded portion 13, the rotary speed, arc power, or the like.

This welding has a feature that the workpiece 600 is rotated at the predetermined speed unitedly with the work holders 137 and 138, the cooling jig 143 for the lower layer coil elements, and the cooling jig 142 for the ground and the upper layer coil element 4. By application of the TIG welding, the welding can be conducted in a very short period in comparison with fusing, ultrasonic welding, and the like, which has been used conventional rotors. In particular, continuous welding in rotating the workpiece 600 is very effective to improve the productivity. Although in this embodiment, the welding apparatus is the vertical type and has the single torch 140, the torch 140 can be provided in a plural number to improve the work efficiency. It is to be noted that, in addition to the TIG welding as described above, the use of laser welding, or a slant position of the rotor will contribute to improve the efficiency of welding.

Figure 21:
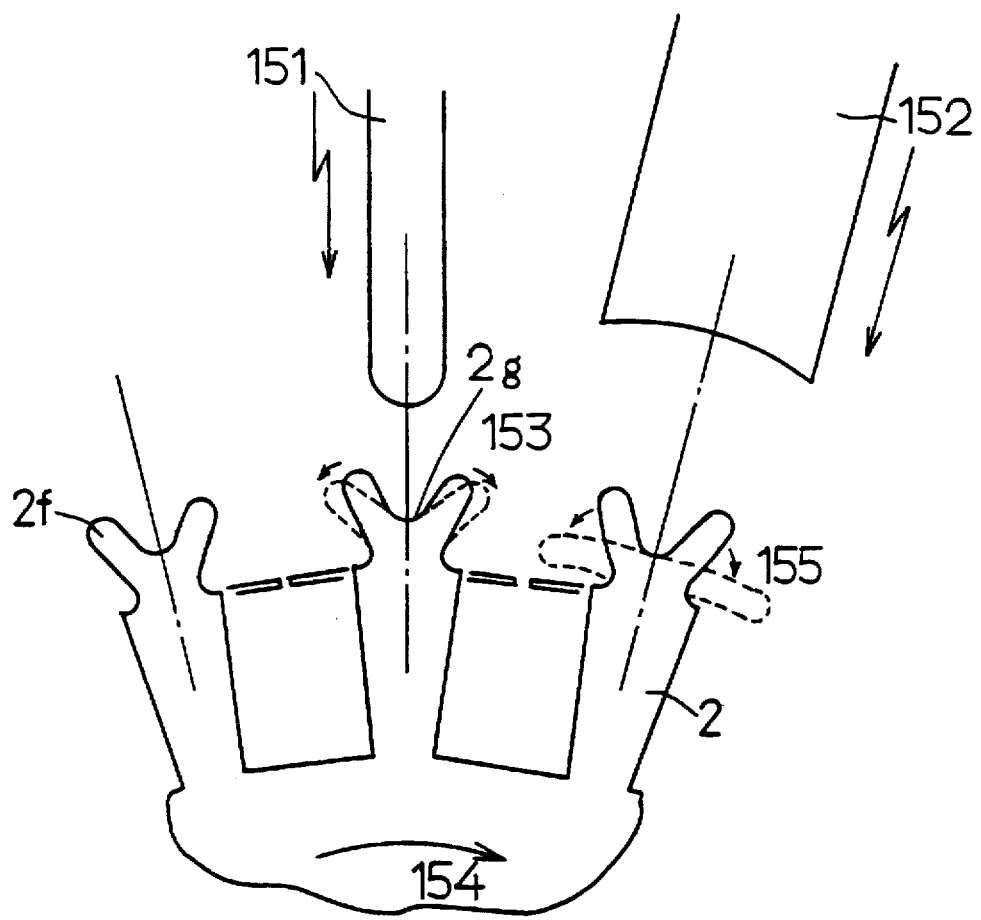
FIG. 21 is an illustration depicting a process in which projections of a lamination core are flattened.
Figure 22:
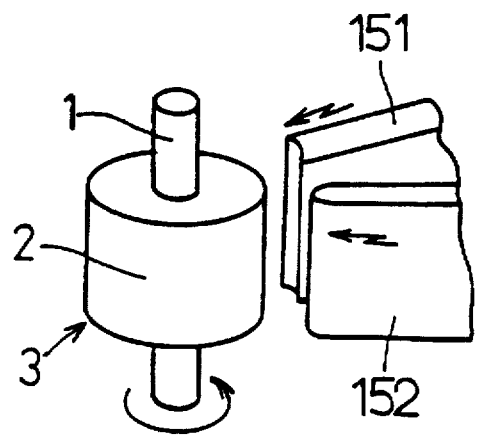
FIG. 22 is a perspective illustration showing the same process in FIG. 21.
Figure 23:
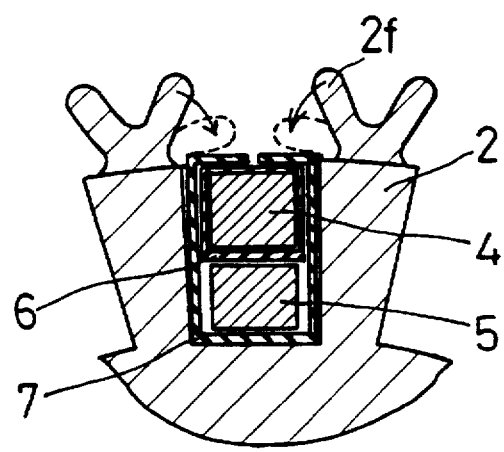
FIG. 23 is a fragmentary cross section showing the slot and its vicinity.

Referring to FIGS. 21 to 23, a bending process in which projections 2f projecting from the outer round surface of the armature core 2 are bent to reinforce so as to prevent the upper and lower layer coil elements 4 and 5 from being separated from the slots 2a by centrifugal force when rotated, is described. FIG. 21 is a schematic view showing a process in which the projections 2f on the lamination core 2 are flattened; FIG. 22 is a schematic perspective view showing the process in FIG. 21; and FIG. 23 is a fragmentary cross section showing the slot 2a and its vicinity.

First, a caulking punch 151 having a narrow width with the center extending radially and a caulking punch 152 having a wide width with a flat head are arranged with a predetermined angle differential between punches 151 and 152 so that both punches 151 and 152 come to position at the centers of pairs of projections 2f which are projecting in a V-shape and located adjacently at openings of the slots 2a. The caulking punch 151 movable toward the center of the armature core is inserted in a recess 2g between the projections 2f to transform the projections 2f in directions indicated by an arrow 153. After the caulking punch 151 is withdrawn, the rotor 3 is rotated in a direction indicated by an arrow 154 and positioned thereat again, and then, the projections 2f are transformed in directions shown by an arrow 155 by the movement of the caulking punch 152 toward the center of the armature core 2, thereby shutting or closing the slot 2a. According to this two-step bending method, it is unnecessary to finish the outer round surface of the rotor 3 with grinding or otherwise, so that the method realizes a significant improvement of productivity. The top ends of the slot inner insulators 6 and 7 are simultaneously bent to insulate between the projections 2f and the upper layer coil sides 4a as well as to hold the slot inner insulators 6 and 7. It is to be noted that it would be no problem to implement this process before the welding process of the upper and lower layer coil elements 4 and 5.

An assembling process of the insulating ring 8 serving as an insulator is made as follows. The insulating ring 8 is made by punching off an insulating material in the form of a film or a plate or by molding a resin material. The insulating ring 8 is inserted to both ends of the rotor 3 until contacting the upper layer coil ends 4b of the upper layer coil elements 4. The insulating ring 8 can be first attached to a side in contact with the rotor 3 of the reinforcement member 11 and then be mounted on the rotor 3 together with the reinforcement member 11.

Figure 24:
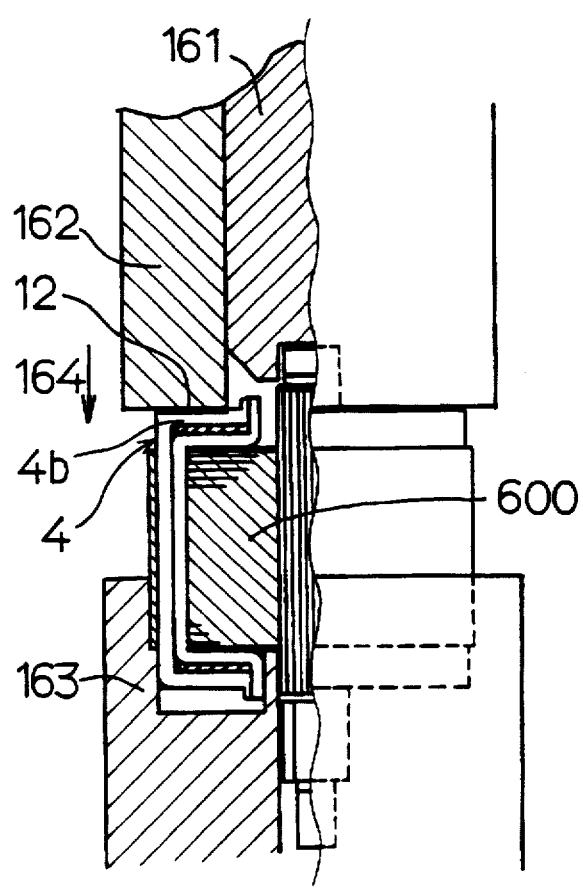
FIG. 24 is a schematic fragmentary cross section showing a process in which a surface of a commutator is pressed to be flat.

Referring to FIG. 24, a process for improving the flatness of the outer end surface 12 (a commutator surface; see FIG. 2) of the upper layer coil ends 4b of the upper layer coil elements 4 by pressing with a press machine or the like, is described. Jigs for this process are constituted of a lower portion receiving jig 163 for the workpiece 600, a top holding jig 161, and a pressing jig 162 for smoothing the commutator surface 12. The upper layer coil ends 4b with roughness, used for the commutator, is smoothed by pressing the pressing jig 162 toward an arrow 164 while the jigs 161 and 163 hold the workpiece 600. This process can be conducted solely or at the same time when another process or other processes are conducted before the attachment of the upper layer coil elements 4, or can be conducted, notwithstanding, before or after the attachment of the reinforcement member 11. This process easily allows size deviations, in particular, the thickness, of parts of the rotor 3 to be reduced, and can improve mechanical strength of the entire rotor 3. This process may eliminate finishing of the commutator surface such as grinding or cutting depending on surroundings of the use and may also make unnecessary expensive equipment and running costs.

The attaching process of the reinforcement member 11 is made as follows. FIG. 8 shows an example of a cross section of the reinforcement member 11. The reinforcement member 11 is made by pressing, casting, grinding, resin molding or the like. A cylinder 11a of the reinforcement member 11 is pushed and engaged with the shaft 1. When the reinforcement member 11 is pushed in a direction of an arrow 110, the tip of the outer cylinder end 303 of the reinforcement member 11 pushes and holds the upper layer coil ends 4b of the upper layer coil elements 4 through the insulating ring 8, thereby firmly holding the upper and lower layer coil elements 4 and 5.

Figure 25:
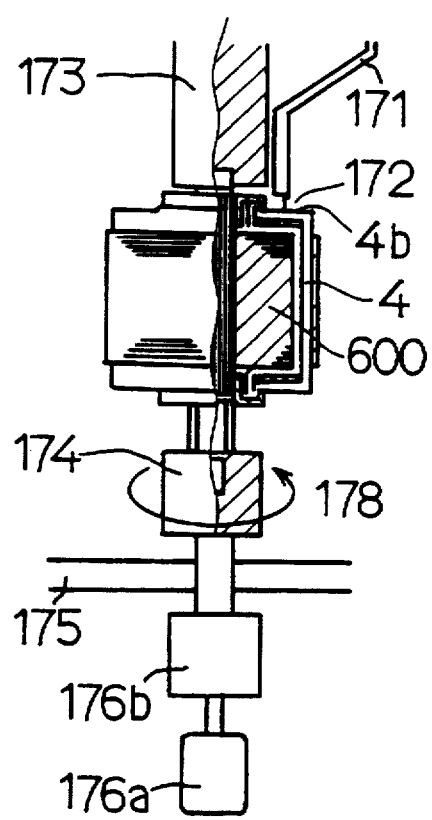
FIG. 25 is a schematic fragmentary cross section showing a process in which resin liquid is applied among the upper layer coil ends of the upper layer coil elements.
Figure 26:
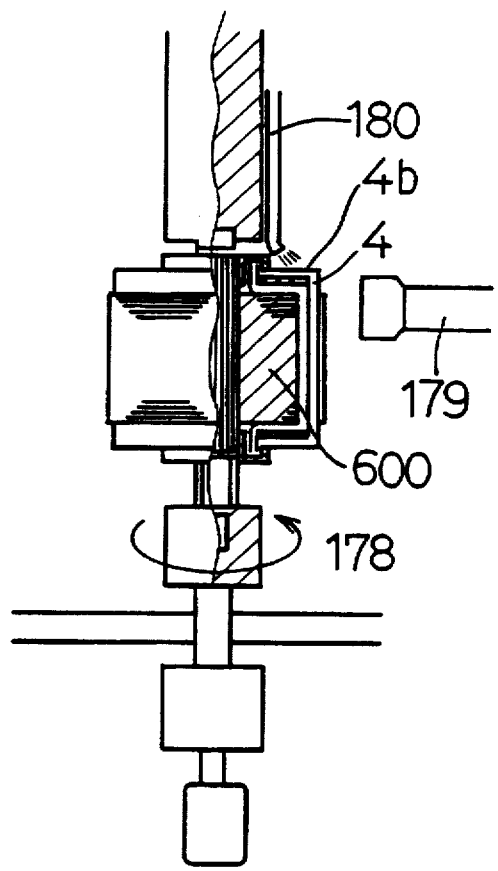
FIG. 26 is a schematic fragmentary cross section showing a process in which the applied resin liquid is blown away.

Next, reinforcement by resin on the commutator surface 12 is described. These exemplify the cases when the commutator surface 12 is reinforced by a droplet method in use of liquid resin, by a fluid dipping method in use of powder type resin, and by an electrostatic coating method. FIGS. 25 and 26 show an example of the liquid resin droplet method; FIG. 25 shows the dropping process of the liquid resin; and FIG. 26 shows the blowing out process of the resin. Those two processes can be conducted in the same unit or section sequentially, or separately in the different units.

As shown in FIG. 25, the workpiece 600 is held by an upper holding jig 173 and a lower holding jig 174, and rotated by a motor 176a and a decelerator 176b together with the jigs in a direction of an arrow 178. The liquid resin 172 is supplied to and dropped onto the outer round surface, or the commutator surface, of the upper layer coil ends 4b of the upper layer coil elements 4 by a resin supplying mechanism 171, or a resin dropping nozzle. During the blowing out process, the workpiece 600 is rotated in the same manner as during the dropping process. On the commutator surface, air is blown by an air nozzle 180 from the inside to the outside, and suction 179 sucks sprayed resin at the outside of the workpiece 600. In a conventional technique, the resin molded commutator was fabricated separately from the lamination core 2. Such manufacturing of the resin molded commutator required great labor and resulted in expensiveness. In this embodiment, in contrast, the commutator is not required to be provided separately, and fabrication of the commutator surface and reinforcement of the body can be realized only by dropping the liquid resin onto the commutator surface during the manufacturing process of the rotor, dispersing the resin, and smoothing the resin.

A hardening process for the resin material to reinforce the body as described above and a heating process to remove stress within the rotor are made as follows. First, the rotor 3 is inserted in a furnace, or the like, thermal condition around the rotor and is set to be similar to the worst usage environment of the rotor. When the setting temperature of the resin material is higher than the temperature of the worst usage environment, the temperature of the furnace is set at the setting temperature of the resin material. With the structure inclusive of such a resin material, according to the usage environment, due to thermal expansions, evaporation of residual gases within the resin, or the like, the size of the commutator surface may be varied, and the performance of the rotor may be impaired. Therefore, as of this process, precision of the size would be stable where the commutator surface is finished after the rotor is exposed to a similar condition to the usage environment while manufactured. If the lower layer coil elements 5 and the upper layer coil elements 4 are not reinforced by any resin material, this heating process can, as a matter of course, be omitted, but this heating process can solely be conducted even if no resin material is used because the heating process may remove the inside stress remaining within the conductive body.

Figure 27:
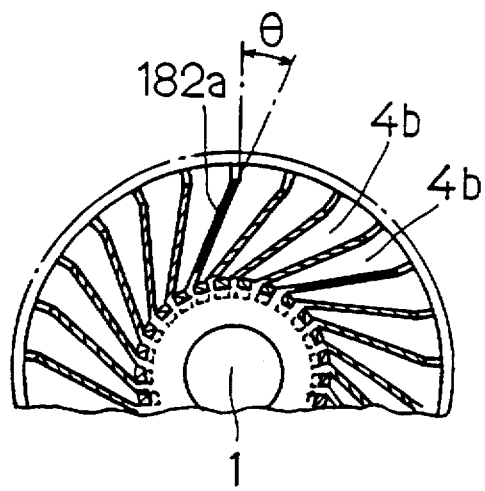
FIGS. 27 and 28 are schematic front views showing portions from which the resin liquid is removed.
Figure 28:
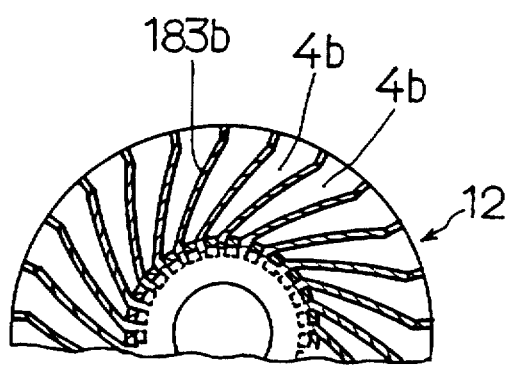

An undercutting process implemented to undercut the surface between the commutator segments when necessary in the case that the commutator surface is reinforced by the resin material, is made as follows. There are several ways to implement the undercutting processes. For example, in this embodiment, when straight grooves are formed between commutator segments as shown in FIG. 27, the undercutting process is conducted by a cutter, and when curving grooves are formed between the commutator segments as shown in FIG. 28, the undercutting process is conducted by a laser.

Figure 29:
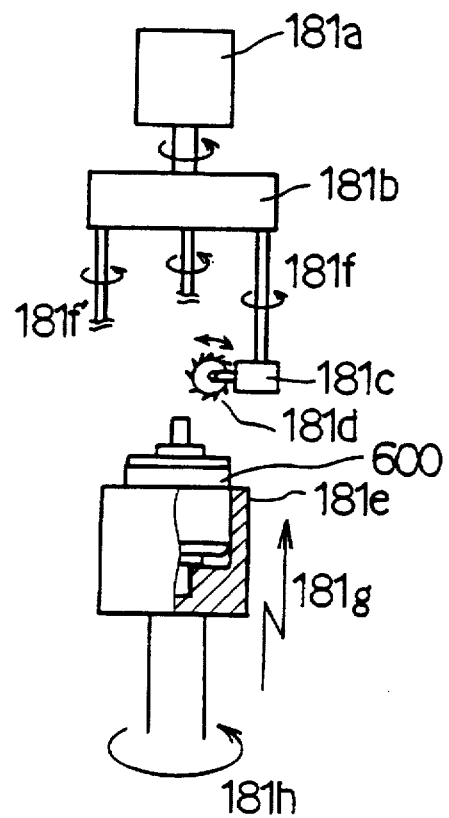
FIG. 29 is an illustration showing a process in which the resin applied during the process in FIGS. 25 and 26 is removed at portions as to form undercut grooves.

First, the undercutting process by the cutter is described below. FIG. 27 is a front view of the commutator surface 12 shown in FIG. 2. The portions to be undercut are the regions 182a (indicated by hatching in FIG. 27) at which undercut grooves are to be formed and at which resin is filled between the upper layer coil ends 4b of the upper layer coil elements 4 to be used for the commutator surface in FIG. 27. The regions 182a are twisted by angle θ with respect to a line extending radially from the shaft 1. FIG. 29 shows an undercutting apparatus for undercutting the regions 182a. The undercutting apparatus is constituted of a cutter drive source 181a such as a motor, a mechanism 181b for dividing the rotary power, a mechanism 181c for changing the direction of the rotary power, a cutter (with a joint) 181d, a positioning and holding mechanism 181e for the workpiece, and drive shafts 181f and 181f' after the rotary power is divided. The cutter 181d is positioned at a place twisted by the angle θ against the axis of the workpiece 600. The place is shown in black among the regions 182a in FIG. 27. The rotary power generated at the drive source 181a is divided by the dividing mechanism 181d for the shafts by a necessary number of the shafts and transmitted to the cutter 181d after changed in the necessary direction at the mechanism 181c for changing the rotary direction. The workpiece 600 is rotated in a direction indicated by an arrow 181h and is positioned at a predetermined angle (at which the cutter 181d and the region 182a are in the same place). After positioned, the workpiece 600 is traveled in a direction indicated by an arrow 181g, so that the workpiece 600 is undercut. Such undercutting can be conducted at the same time at plural portions by diving the rotary power to the cutter drive shaft 181f' and providing a cutter at another portion, since undercutting solely one portion at one time makes efficiency lower.

Figure 30:
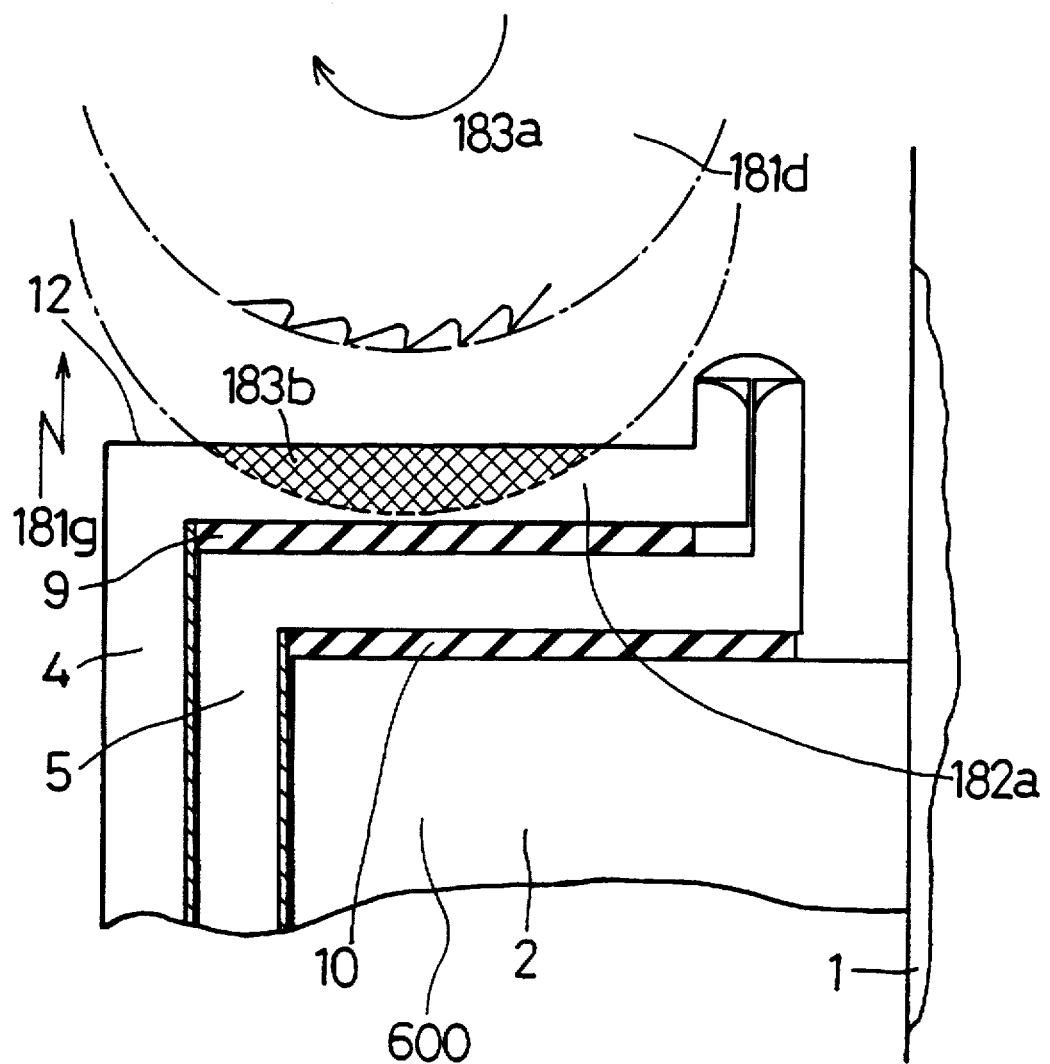
FIGS. 30, 31 and 32 are fragmentary cross sections showing a situation of the resin removing process in FIG. 29.

FIG. 30 shows the detail of the cutting portion. The cutter 181d is rotated in a direction indicated by an arrow 183a.

15

Figure 31:
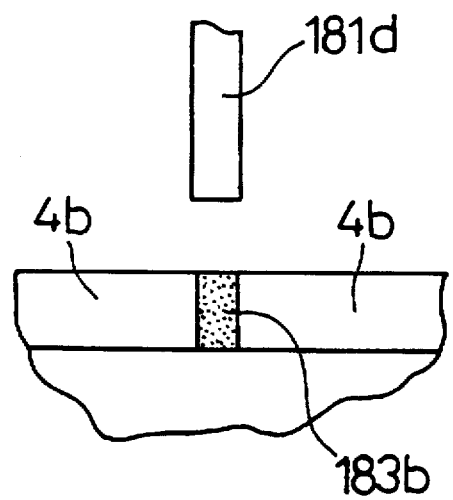
Figure 32:
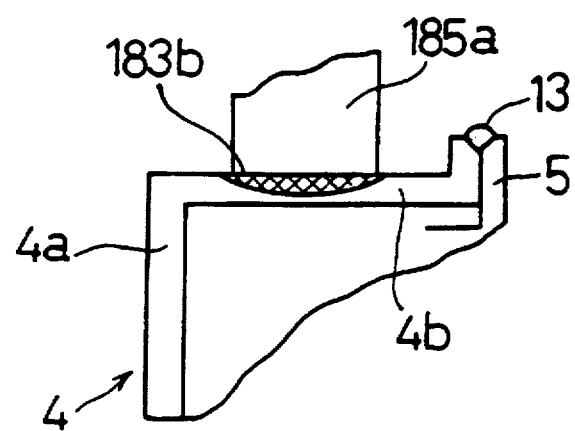

The workpiece 600 is sent in a direction indicated by an arrow 181g. The commutator surface 12 of the upper layer coil ends 4b of the upper layer coil elements 4 is removed at portions 183b whose cross section is indicated in FIG. 30 by cross-hatching. It is preferable as shown in FIG. 31 that the interval between the upper layer coil ends 4b is narrower than the width of the cutter 181d. FIG. 32 shows details of dimensional sizes to be traveled. The numeral 185a represents a brush. The depth of the portion 183b to be removed by undercutting is designed to be the size satisfying three conditions at the same time in which: the size is 0.5 millimeter or more; the size never penetrates the insulator 9; and the cutter 181d does not contact the welded portion 13. According to this embodiment, there is a remarkable advantage that the undercut grooves are readily formed even where the resin regions between the upper layer coil ends 4b are curved or crooked with respect to a plane of the surface 12.

Figure 33:
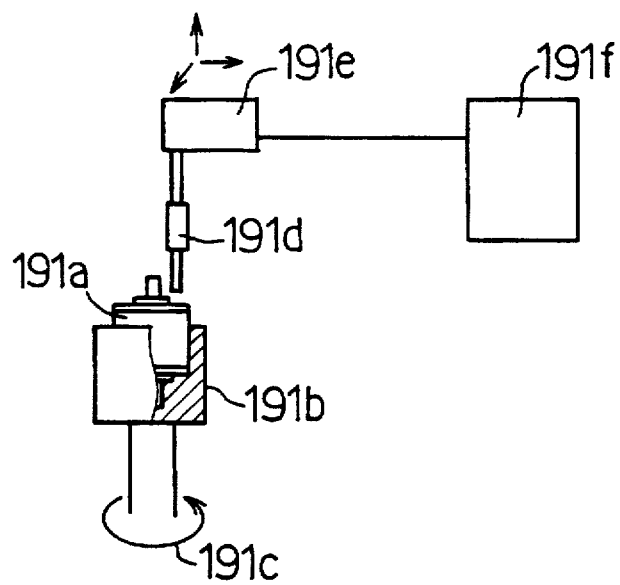
FIG. 33 is an illustration showing a process in which the resin applied during the process in FIGS. 25 and 26 is removed by laser at portions as to form undercut grooves.

Next, an undercutting method by the laser when the resin regions between the upper layer coil ends 4b extend curvedly is described. The regions to be cut are curved as shown in FIG. 28 as different from the grooves in FIG. 27. The form allows the area of the upper layer coil ends 4b to be wider and thereby improves commutation performance of the rotor. FIG. 33 shows a diagram of the outline of the laser undercutting apparatus. The undercutting apparatus is constituted of a holding mechanism 191b for the workpiece 600, an emitting mechanism 191d for laser beam, a positioning mechanism 191e for laser, and a laser oscillator device 191f. The workpiece 600 is held by the holding mechanism 191b at a predetermined position. The laser emitting mechanism 191d is controlled as to depict a trace of a predetermined curve by the positioning mechanism 191e (cam or servomotor). By use of this method, undercutting of curves extending arbitrarily is obtainable which is impossible by the use of the conventional cutter.

Regarding the finishing process of the commutator surface, the commutator surface can be finished by grinding or cutting, in addition to the smoothing process of the commutator surface as described above, depending on the use conditions, the precision required for the products. Then, the rotor is completed by implementing, when necessary, an electrical test, a balance test, a dimension test, or the like.

[Advantages of the First Embodiment]

According to the manufacturing method for the rotor of the invention, because the manufacturing method includes the steps of previously preparing a plurality of upper layer coil elements 4 having a pair of upper layer coil ends 4b electrically connected at both ends of the upper layer coil side 4a in extending with a right angle from the upper layer coil side 4a and inclined by a predetermined angle with respect to the upper layer coil side 4a in a circumferential direction of the armature core, and a plurality of lower layer coil elements 5 having a pair of lower layer coil ends 5b electrically connected at both ends of the lower layer coil side 5a in extending with a right angle from the lower layer coil side 5a and inclined by a predetermined angle with respect to the lower layer coil side 5a in a circumferential direction of the armature core, inserting the prepared upper and lower layer coil elements 4, 5 into the corresponding slots 2a of the armature core in moving in a radial direction from the outside of the armature core, and coupling a connector 4c of the upper layer coil ends 4b inserted in one of the slot 2a with another connector 5c constituted of the lower layer coil end 5b of the lower layer coil element 5 inserted in another one of the slots 2a, it is unnecessary to

16 conduct a process in which, as of the conventional method, after the coils are inserted into slots of the armature core, the projecting portion of the coil from the slot is trimmed down to a predetermined length, and which the trimmed coil is inclined by a predetermined angle in a circumferential direction of the armature core 2 in being bent toward the end in the axial direction of the armature core, that is, a complicated, linearly twisting process, so that the projecting portion of the coil can be made in the precise shape.

The coil elements 4 and 5 formed at regions to be formed are simply inserted from the outer round surface in the radial direction of the armature core 2, and only both connectors 4c and 5c are coupled to complete assembling of the coil elements 4 and 5, so that this method can improve significantly assembling efficiency.

Before the lower layer coil elements 5 are inserted into the slots 2a, the inner disc shaped insulators 10 are attached to the ends of the armature core 2; after the lower layer coil elements 5 are inserted into the slots 2a, the outer disc shaped insulators 9 are attached onto the lower layer coil ends 5b in being moved in the axial direction; after this, the upper layer coil elements 4 are inserted. Otherwise, the slot inner insulators 7 having the U-shaped cross section, the lower layer coil elements 5, the slot inner insulators 6 having the U-shaped cross section, and the upper layer coil elements 4 are pushed in this order into the slots 2a from the outer round surface in the radial direction of the armature core 2, and then, the projections 2f for making the slot opening narrower located near the slots 2a on the armature core 2 are transformed plastically to narrow the opening of the slots 2a as well as the top of the slot inner insulator 6 is bent toward the side of the narrowed opening of the slot 2a. According to such methods, no process except the process in which the inner disc shaped insulators 10, the lower layer coil ends 5b, the outer disc shaped insulators 9 are sequentially stacked and assembled on both ends of the armature core 2 can surely eliminate defective connections occurring between the lower layer coil element 5 and the armature core 2 at the ends (coil ends) of the armature core 2 and occurring between the lower layer coil element 5 and the upper layer coil element 4. With the conventional technique, the insulating process for insulating between the lower layer coil elements and the armature is carried out by powder-coating over the armature core or by attaching insulators, and the insulating process for insulating between the lower and upper layer coil elements is carried out by using expensive coated wires. In this embodiment, however, it would be unnecessary to be equipped with any of preheating, coating, and baking apparatuses, which may be required for powder-coating; defective insulation from pin holes or peeling off of wire's coating due to force exerted when the wires are wound can be prevented; simple and strong insulation structure can be obtained.

The lower layer coil elements 5 and the upper layer coil elements 4 are punched off from the plate material into the predetermined shapes; the tips of both coil elements 4 and 5 are bent by the right angle to form the connectors 4c and 5c; before or after the connectors 4c and 5c are bent, the positions located at the predetermined distance away from the tips of both coil elements 4 and 5 are bent by the right angle to form the lower and upper layer coil ends 5b, 4b. According to this method, a pressing machine can be used by selecting the plate material for producing both coil elements 4 and 5, and upon preparation of particularized molds, both coil elements 4 and 5 are very easily formed. Even when the cross section of the coil elements 4 and 5 are varied to obtain rotors having different outputs, the cross section can be arbitrarily varied by altering the width in use of the material in the same thickness, and it would be convenient to manufacture products of various kinds.

In the forming process of the connectors 4c and 5c, the upper and lower mold halves 61 and 63 for clamping the portions of both coil elements 4 and 5, except for the tips thereof, and the molds 62 for bending process relatively movable in the thickness direction of the coil elements 4 and 5 with respect to the upper and lower mold halves 61 and 63 at the positions in slidable contact with the outer periphery of one of the upper mold half 61 and the lower mold half 63, are prepared. The clearance between the outer edge of the the upper mold half 61 and the lower mold half 63 and the bending mold 62 is set to be less than the thickness of the plate material. The tips (connectors 4c and 5c) of both coil elements 4 and 5 are bent by a relative movement of the mold 62 for bending process and squeezed into the portions having a predetermined thickness. In the conventional technique, the first and second straight portions with the outer round surface covered with the coated film were fused to melt the coated film and were coupled with each other. To melt the coated film, however, a large amount of thermal energy and a large size welder were required along with huge power consumption. To the contrary, with the method of the first embodiment, the connectors 4c and 5c do not have any coated film, and have only a thin thickness, so that the connectors 4c and 5c can be coupled satisfactorily with the minimum required thermal energy. In the coupling process in which the connectors 5c of the lower layer coil ends 5b are coupled with the connectors 4c of the upper layer coil ends 4b, the tip of the welding torch 140 of the welder is first placed adjacently at the regions to be welded of both connectors 4c and 5c; the regions to be welded are then welded by the welding torch 140 in grounding both coil elements 4 and 5 located near the welding torch 140; after welding is completed, the armature core 2 is rotated by a predetermined angle; and subsequently, those two processes are repeated. According to such processes, a simple apparatus can automatically weld the connectors because the armature core 2 is rotated sequentially and the connectors are welded sequentially.

According to the method of this embodiment, the upper and lower layer coil elements 4 and 5 located adjacent to, but except for the regions to be welded, and are cooled in contact with the lower layer coil cooling jig 143 and the upper layer coil cooling jig 142. According to this method, the upper and lower layer coil elements 4 and 5 located adjacent to the regions to be welded are cooled in contact with the lower layer coil cooling jig 143 and the upper layer coil cooling jig 142, thereby reducing increment of the temperature except for connectors 4c and 5c, and thereby preventing portions except for the connectors 4c and 5c from melting. That is, when the connectors 4c and 5c are welded, melting tends to proceed beyond the regions to be welded and to the proximal sides of the connectors 4c and 5c. Although when this happens, in the worst case, the upper layer coil ends 4b or lower layer coil ends 5b located adjacently in the circumferential direction are in contact with themselves thereby resulting in defective situations, the method of this embodiment can prevent this.

In the process for forming the lower layer coil ends 5b and the upper layer coil ends 4b, the upper and lower mold halves 71 and 73 for clamping the center portions of the coil elements 4 and 5 except for the portions to be the lower layer coil ends 5b of the lower layer coil elements 5 and to be the upper layer coil ends 4b of the upper layer coil elements 4, and the mold 72 for bending process relatively movable in the thickness direction of the coil elements 4 and 5 with respect to the upper and lower mold halves 71 and 73 at the positions in slidable contact with the outer periphery of one of the upper mold half 71 and the lower mold half 73, are prepared; the portions to be the lower layer coil ends 5b and the upper layer coil ends 4b are bent by relative movement of the mold 72 for bending process. According to such a method, the lower layer coil ends 5b and the upper layer coil ends 4b are formed by preparing the simple mold for bending process 72 readily produced and by using a pressing machine generally and widely used, so that the lower layer coil ends 5b and the upper layer coil ends 4b can be formed easily.

The coil elements 4 and 5 in a number corresponding to all the slots 2a are set in proximity of the openings of all the slots 2 formed on the armature core 2, and subsequently, the set coil elements 4 and 5 are pushed at once into the slots 2a. According to this method, the respective upper layer coil elements 4 and the respective lower layer coil elements 5 are attached in the slots all at once, so that the coil elements 4 and 5 serve as guides for one another, so that the coil ends 4b and 5b of the coil elements 4 and 5 adjacent to each other and the coil ends 4b and 5b of the coil elements 4 and 5 to be attached do not interfere with each other to disturb the attachment, and so that the coil elements 4 and 5 are easily attached. Since all the coil elements 4 and 5 are assembled at one time, this method can bring, as a matter of course, very high productivity, thereby enabling to manufacture a large amount of rotors with less costs.

In this method of the first embodiment, the processes are repeated in which plural coil groups consisted of the lower layer coil elements 5 and the upper layer coil elements 4 are set in opposition to the openings of the slots 2a, in which each coil group being set is then pushed into the corresponding slot 2a, in which the armature core 2 is rotated by the predetermined angle until insertion of the next coil group. According to this method, insertion can be conducted in a single direction, and therefore, the inserting apparatus can be simplified, because: the lower layer coil elements 5 and the upper layer coil elements 4 are divided into the plural coil groups; each coil group is inserted into the corresponding slot 2a; the armature core 2 is rotated; and then, the next coil group is inserted in the slot 2a. That is, the attachments of the coil elements can be conducted manually or by using simple jigs, so that this attaching method can be ideal for production of a small or middle amount.

Where the pressing jig 162 having the flat pushing surface arranged on a side in the core's radial direction facing the outer ends of the upper layer coil ends 4b is prepared so as to be movable in the axial direction of the core, the commutator surface 12 is smoothed by pushing the pushing surface of the pressing jig 162 onto the outer ends of the upper layer coil ends 4b, or the commutator surface 12. According to this method, the commutator surface 12 is merely pushed without more, so that widely used, simple and inexpensive pressing machines can be used to realize such smoothing process. That is, with the conventional technique, grinding or cutting process allows the commutator surface to be finished with good precision, but there arise problems that processing speed is slow and that the conventional method becomes expensive because the conventional method requires consumptive tools such as a cutter and large scale apparatuses such as a grinder or a cutting machine. With the method of the embodiment, those problems can be solved.

In this embodiment, the lower layer coil elements 5 and the upper layer coil elements 4 are fitted into the slots 2a on the armature core 2; while the armature core 2 is held so that the slot 2a extends vertically, the upper layer coil elements 4 are coated on the surface thereof with the liquid resin 172 in rotating the core and in dropping droplets of the liquid resin 172 from the resin dropping nozzle 171; then, the armature core 2 is further rotated, and the liquid resin 172 is blown off by the air from the air nozzle 180 to the surfaces of the upper layer coil ends 4b. According to this method, the liquid resin easy to be handled is dropped near the regions of the upper layer coil ends 4b to be reinforced, is made to permeate into space between the upper layer coil ends 4b utilizing the permeant nature of the liquid, and is further rotated, thereby being unified, enabling to remove unnecessary liquid resin 172, enabling to constitute necessary insulation layers with the minimum liquid resin 172 to be required, and further enabling the corrected liquid resin 172 to be used again.

[Second Embodiment]

Figure 34:
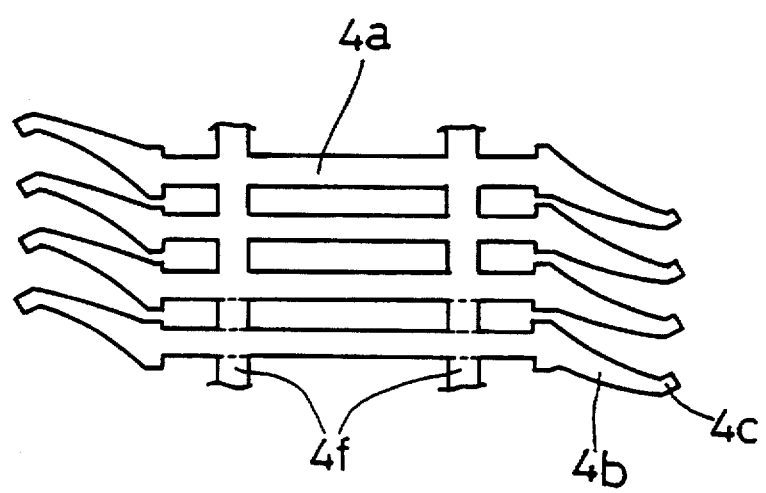
FIG. 34 is a plan view showing upper layer coil elements of the second embodiment.

Next, the second embodiment will be described. Referring to FIG. 34, a manufacturing method for producing a plurality of the upper layer coil elements 4 and the lower layer coil elements 5 at the same time, is described. Where the punched member is made by punching off a conductive plate as of a plate material, the respective upper layer coil elements 4 are arranged in parallel in a row with a constant interval therebetween, and the adjacent upper layer coil elements 4 are connected through connections 4f. The number of the connections can be determined arbitrarily. The upper layer coil elements 4 (as well as the lower layer coil elements 5) made of the punched member can be bent in the same manner as the first embodiment after the connections 4f are detached by cutting as shown by dotted lines in FIG. 34. Alternatively, before the connections 4f are detached, the connectors 4c or the upper layer coil ends 4b can be bent. For example, while the punched member is conveyed in one direction, the punched member is bent at the foregoing position, and the connections 4f are detached thereat. Moreover, using a punched member having the upper layer coil elements 4 of a predetermined number, the portions of the elements 4 may be bent at one time, and then, the connections 2f may be detached at one time.

According to this process, a large amount of the upper layer coil elements 4 and the lower layer coil elements 5 can be manufactured at one time through trimming of multiple pieces, not only thereby improving the production efficiency and enabling to provide the upper layer coil elements 4 and lower layer coil elements 5 with low costs, but also making easily stable the size precision of the products such as bent angles because the elements are punched off at one time and then bent.

It is to be noted that where the punched member in which the upper layer coil elements 4 are arranged in a row is conveyed in a direction of the arrangement, an adhesive tape, for example, may be attached to the respective upper layer coil elements 4, or preferably to the upper layer coil sides 4a, before the connections 4f are detached sequentially at the foregoing portion of the punched member that has been bent. Otherwise, the upper layer coil sides 4a of the respective upper layer coil elements 4 are held by holders located in a row for holding the upper layer coil elements 4. For example, the respective holders may be capable of resiliently clamping the upper layer coil sides 4a. Those holders are connected, driven, and proceeded annularly along the outer round surface of the rotor 3 as they are. When the adhesive tape is used, the adhesive tape is similarly proceeded annularly along the outer round surface of the rotor 3. The respective upper layer coil elements 4 may subsequently be pushed into the slots 2a at one time. A sequence of the process for bending the upper layer coil elements 4 and the process for attaching the elements 4 into the slots can be readily conducted automatically.

[Third Embodiment]

Figure 37:
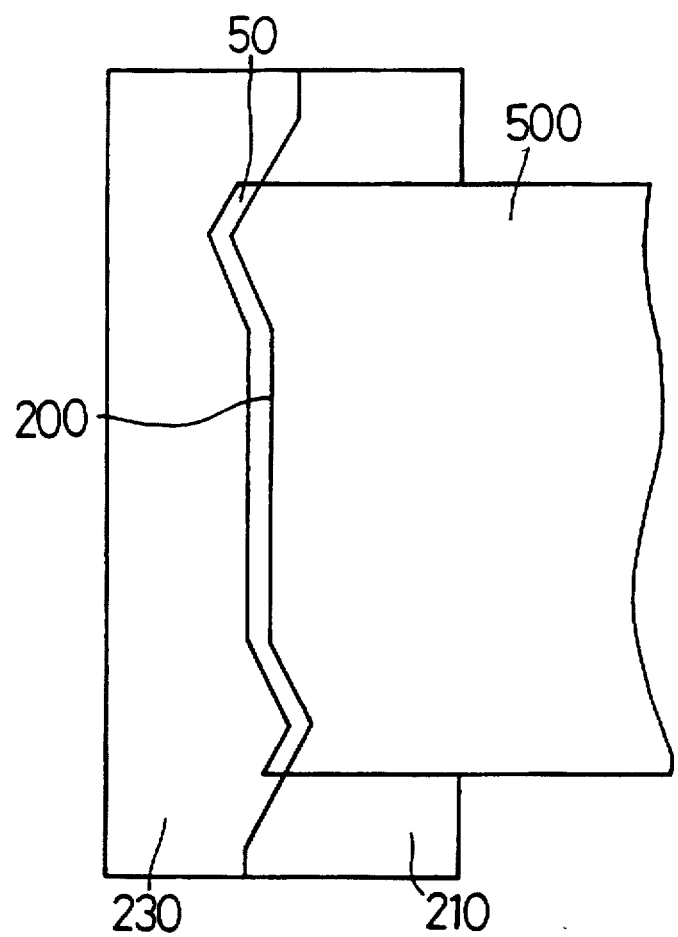
FIG. 37 is a plan view showing a lower mold half of a lower layer coil cutting apparatus for cutting the conductive plate shown in FIG. 35.

The third embodiment is for a method for manufacturing the lower layer coil elements 5 from a conductive plate 500 as a plate material. FIG. 35 shows cutting lines in a method in which the extended bodies 50 of the lower layer coil elements 5 are cut off piece by piece the foregoing portion of the conductive plate 500; FIG. 36 is a perspective view showing a situation that a piece of the extended body 50 is to be cut; FIG. 37 is a plan view showing lower molds 210 and 230 of a cutting apparatus; and FIG. 38 is a fragmentary vertical cross section showing the mold of the cutting apparatus.

The cutting apparatus is constituted of a feeding device, not shown, for feeding the flat shaped conductive plate 500 in a single horizontal direction by a constant pitch with a contact interval, an upper guide 220 and a lower guide 210 (or die) serving as molds disposed vertically astride a space through which the conductive plate 500 passes, the holding mold 230 for holding the workpiece after cut, and a cutter 240 made of a cutting mold disposed over the holding mold 230. The left edges of the molds 210 and 230 and the right edges of the molds 230 and 240, when combined, has a shape substantially same as the cutting line, or the right side main edge 200 of the extended body in FIG. 37.

Figure 38:
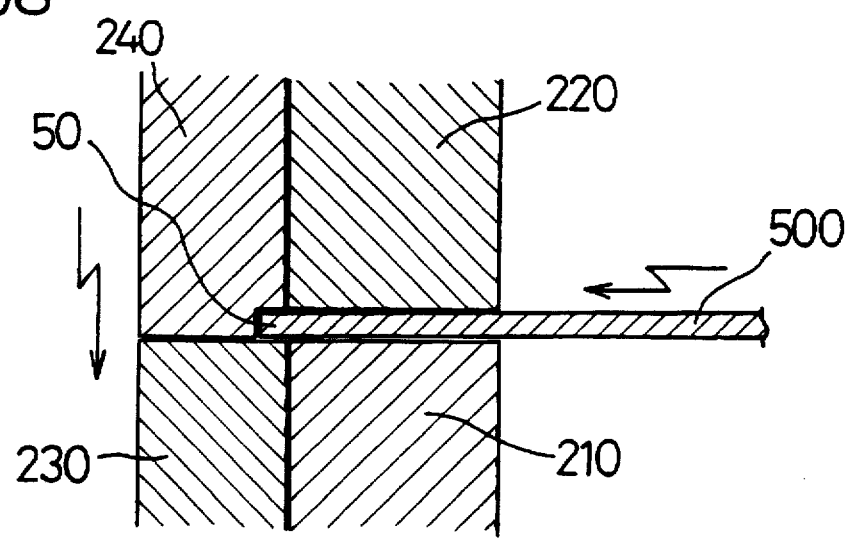
FIG. 38 is a fragmentary vertical cross section showing the lower layer coil cutting apparatus shown in FIG. 37.

The mold 220 for holding the plate 500 is slightly moved up with respect to the fixed die 210, and then, the conductive plate 500 is fed by the constant pitch toward the lift side in FIGS. 37 and 38. At that time, the holding mold 230 after cutting waits at a lower position so as not to disturb the feed of the plate. When such feeding is completed, the upper guide 220 is then moved down to clamp the conductive plate 500. Subsequently, the cutter 240 is moved down, thereby cutting the foregoing portion of the conductive plate 500, and thereby producing the extended body 50. The extended body 50 is then subjected to the processes shown in FIGS. 10 to 13, as explained with reference to the first embodiment, thereby making the lower layer coil elements 5 in the predetermined shape.

According to this method, the extended bodies 50 of the lower layer coil elements 5 can be obtained easily with a high yield; the lower layer coil elements 5 substantially same as of the first embodiment can be obtained by bending such extended bodies 50 in the substantially same manner as the upper layer coil elements 4 as described above; the life of the cutter cannot be shortened even if the width of the extended bodies 50 is thinner than the thickness of the conductive plate 500.

With this embodiment, the lower layer coil sides 5a serving as the coil sides of the extended bodies 50 of the lower layer coil elements 5 extend in a crosswise direction of the conductive plate 500, and the lower layer coil ends 5b and the connectors 5c serving as the coil ends and the connectors extend in an oblique direction with respect to the crosswise direction of the conductive plate 500. Accordingly, when the conductive plate 500 is cut after fed by the constant pitch, the lower layer coil sides 5a have the same width as the pitch, whereas the lower layer coil ends 5b and the connectors 5c have a width narrower than the pitch. Since the connectors 5c are welded to be coupled with the connectors 4c of the upper layer coil elements 4, forming the connectors 5c in the narrower width is very effective for reducing the thermal capacity and for securing adequate space between connectors 5c adjacent to each other because the connector 5c is located in the proximity of the outer round surface of the shaft 1 and extends in the axial direction.

[Fourth Embodiment]

Figure 39:
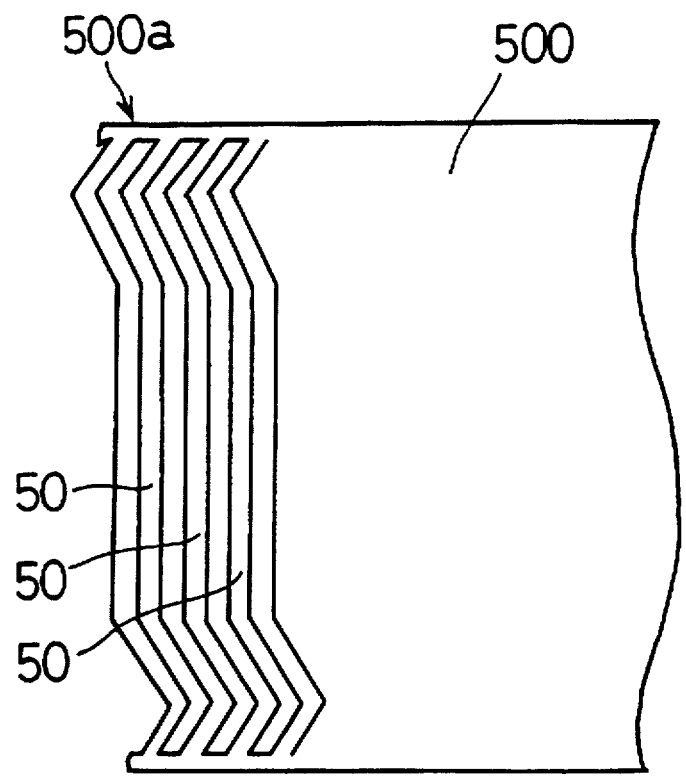
FIGS. 39 and 40 are fragmentary plan views showing a conductive plate from which lower layer coil elements are punched off according to the fourth embodiment.
Figure 40:
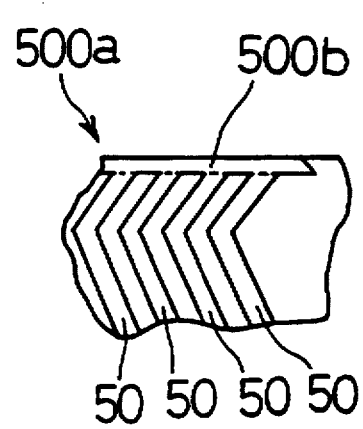

Referring to FIGS. 39 and 40, another method for producing the extended bodies 50 (see FIGS. 3(a) and 3(b)) of the lower layer coil elements 5 from the conductive plate 500 is described. FIG. 39 is a plan view of the conductive plate 500 showing a situation after three extended bodies 50 are punched off from the conductive plate 500.

First, as shown in FIG. 39, three extended bodies 50 arranged in a row and in parallel to each other are punched off at the same time. It is to be noted that the extended body 50 can be punched off piece by piece as matter of course. Then, as shown in FIG. 40, both side residual portions 500b of the remaining portion 500a of the conductive plate 500 at which some extended bodies 50 already have been punched off are further punched off as shown by the dotted line so as to extend in the longitudinal direction of the conductive plate 500, thereby making the portion of the remaining portion 500a between punched holes adjacent to each other turn into another set of extended bodies 50. In this embodiment, the extended bodies 50 are punched off so that the longitudinal direction of the lower layer coil sides 5a coincides the crosswise direction of the conductive plate 500, and the pitch for one feeding of the conductive plate 500 is set to be twice of the width (in the feeding direction) of the lower layer coil side 5a. The lower layer coil elements 5 in the predetermined shape are subsequently completed according to the processes for the extended bodies 50 shown in FIGS. 10 to 13 described in the first embodiment.

With this method thus described, the extended bodies 50 of the lower layer coil elements 5 can be obtained readily with a high yield. Even if the width of the extended body 50 is narrower than the thickness of the conductive plate 500, the life of the cutter is not shortened.

[Fifth Embodiment]

Referring to FIGS. 41 to 44, another method for producing the extended bodies 50 (see FIGS. 3(a) and 3(b)) of the lower layer coil elements 5 from the conductive plate 500, according to the fifth embodiment, is described. FIGS. 41 to 44 show the remaining portion 500a of the conductive plate 500 from which the extended bodies 50 have already been punched off.

Figure 41:
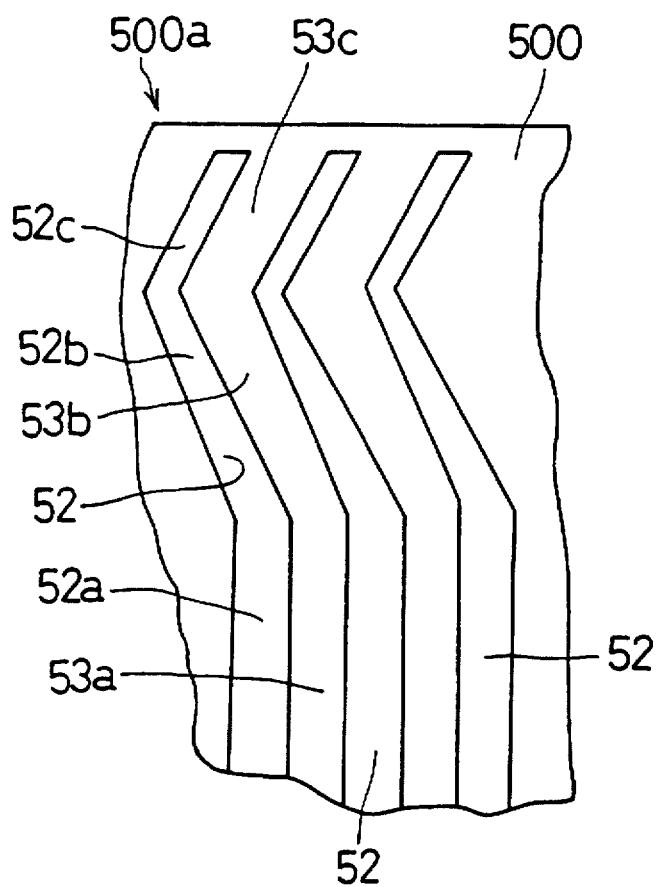
FIGS. 41 to 44 are fragmentary plan views showing a conductive plate from which lower layer coil elements are punched off according to the fifth embodiment.

FIG. 41 is a plan view of the conductive plate 500 showing a situation after three extended bodies 50 are punched off from the conductive plate 500. As shown in FIG. 41, three extended bodies 50 arranged in a row and in parallel to each other are punched off at the same time or piece by piece. By such punching, three holes 52 are formed in the remaining portion 500a of the conductive plate 500. It is to be noted that the lower layer coil ends 5b and the connectors 5c of the lower layer coil elements 5 are greatly narrower than the lower layer coil sides 5a. Accordingly, in the hole 52, the punched portions 52b and 52c corresponding to the lower layer coil end 5b and the connector 5c are much narrower than the punched portion 52a corresponding to the lower layer coil side 5a, and therefore, regions 53b and 53c (located on both ends in the crosswise direction) of the remaining portion 500a of the conductive plate 500 located adjacently to the punched portions 52b and 52c are much broader than the region 53a (located at the center in the crosswise direction) of the remaining portion 500a of the conductive plate 500 located adjacently to the punched portion 52a for the lower layer coil side 5a in the hole 52.

The reason that the width on the side of the connector 5c of the lower layer coil end 5b and the connector 5c are made narrower is to ensure space between conductive bodies, for example, radially adjacent to each other and to reduce the thermal capacity when the connectors 5c and 4c are welded.

Figure 42:
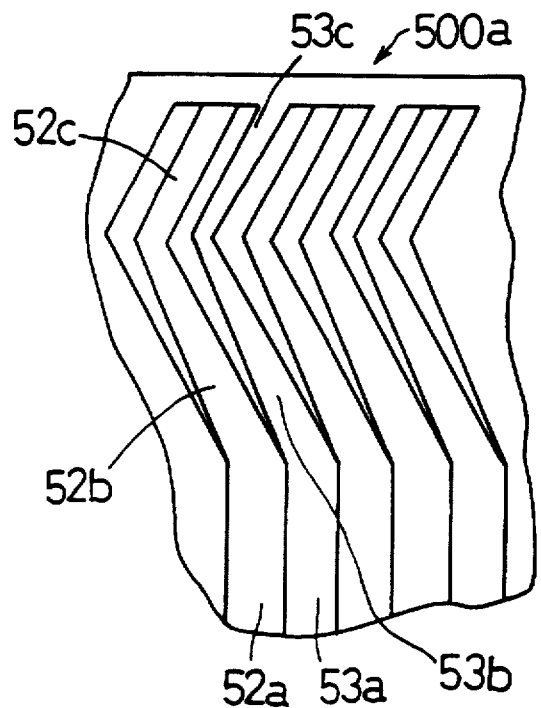
Figure 43:
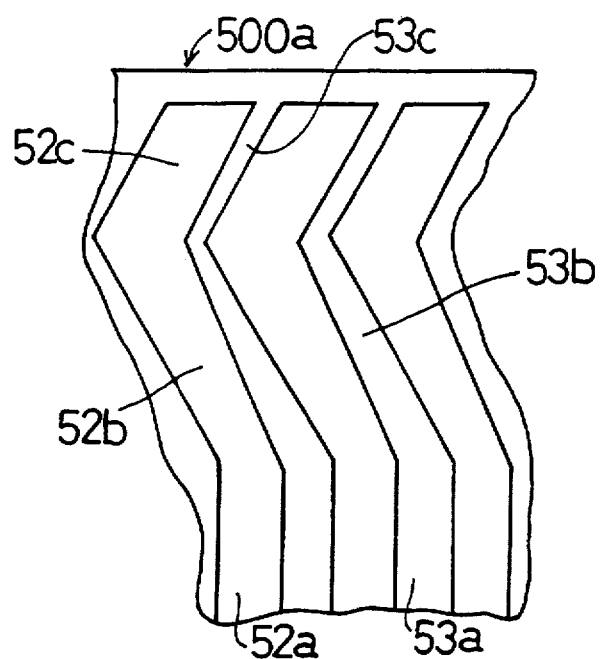
Figure 44:
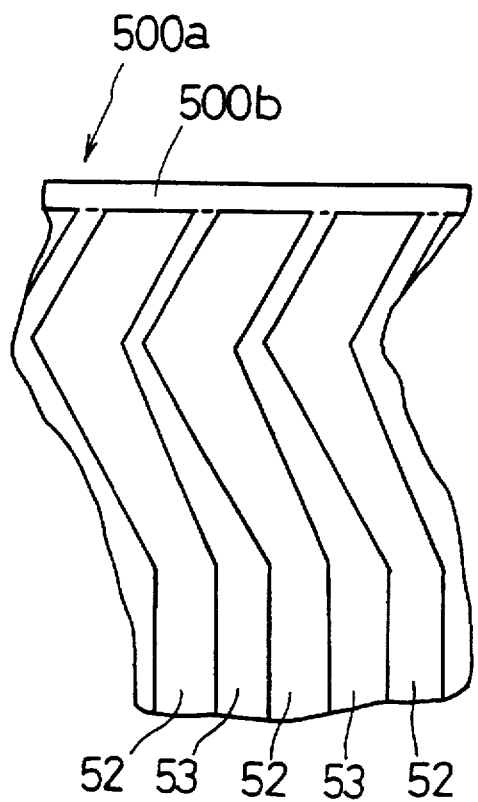

Parts of the regions 53b and 53c (located on both ends in the crosswise direction) of the remaining portion 500a inclusive of the punched portions 52b and 52c of the hole 52, or parts adjacent to the punched portions 52b and 52c, are punched off piece by piece. The thick solid line in FIG. 42 shows regions to be trimmed. By such punching process, as shown in FIG. 43, the regions 53b and 53c (located on both ends in the crosswise direction) of the remaining portion 500a have shapes equal to the lower layer coil end 5b and the connector 5c.

As well as in the fourth embodiment, the straight portions 500b (extending in the longitudinal direction of the conductive plate 500) located on both sides in the crosswise direction of the remaining portion 500a are punched off, thereby converting the portions of the remaining portion 500a between the holes 52 into another set of extended bodies 50. The lower layer coil elements 5 in the predetermined shape are subsequently completed according to the processes for the extended bodies 50 shown in FIGS. 10 to 13 described in the first embodiment.

According to this method, even if the punched portions in the regions 53b and 53c of the remaining portion 500a are very narrow as shown in FIG. 42, such portions can be punched off without making the mold for punching process narrower, so that the life of the mold for punching process can be extended so much.

[Sixth Embodiment]

Figure 45:
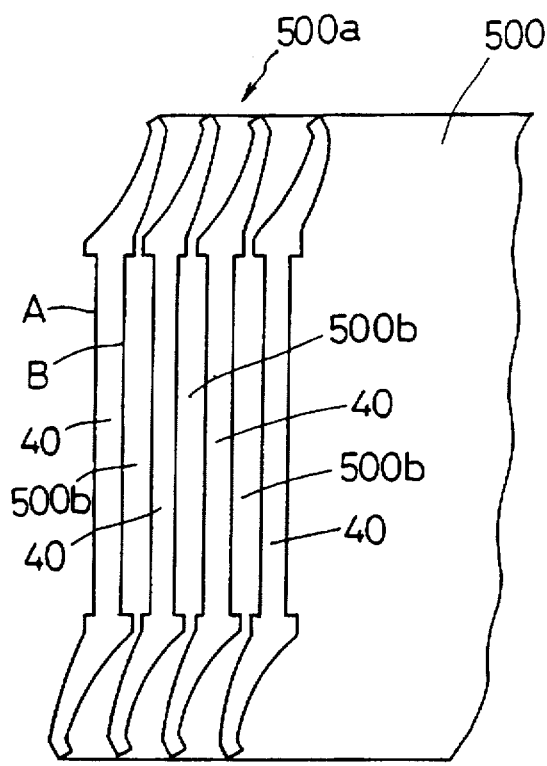
FIG. 45 is a fragmentary plan view showing a conductive plate from which the upper layer coil elements are cut according to the sixth embodiment.
Figure 46:
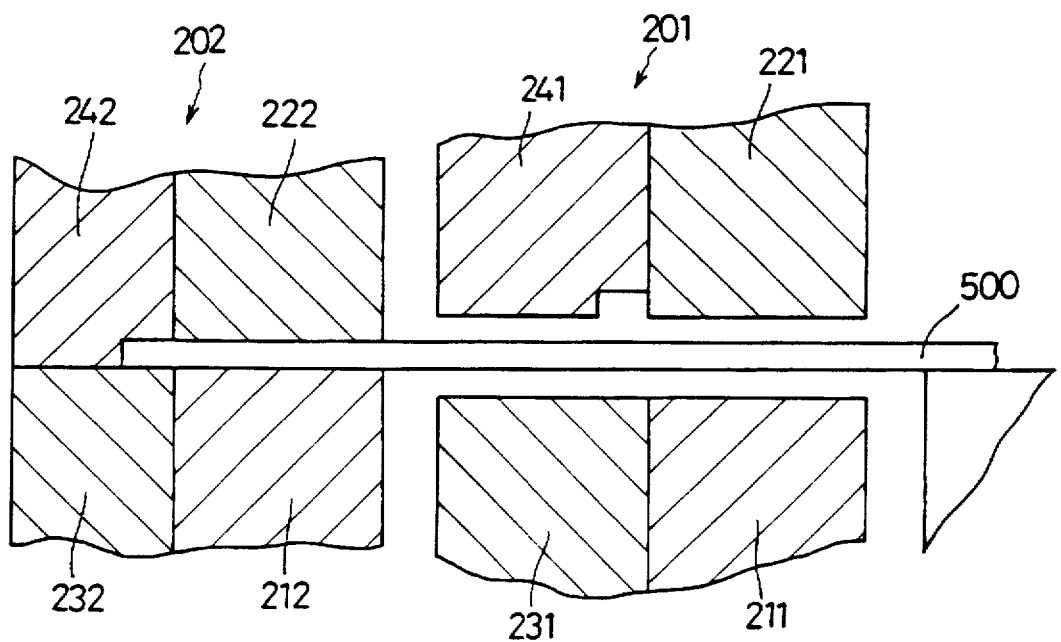
FIG. 46 is a fragmentary vertical cross section showing a cutting apparatus for upper layer coil elements according to the sixth embodiment.

Referring to FIG. 45, another method for producing the extended bodies 40 (see FIGS. 4(a) to 4(c)) of the upper layer coil elements 4 from the conductive plate 500, according to the sixth embodiment, is described. FIG. 45 is an illustration showing cut patterns of the extended bodies 40; FIG. 46 shows a cutting apparatus. That is, in this embodiment, the extended bodies 40 are punched off from a foregoing portion 500a of the conductive plate 500; unnecessary remaining portions 500b are then trimmed; and subsequently, the extended bodies 40 and the remaining portions 500b are alternatively punched off.

This cutting apparatus is constituted of a feeding apparatus (not shown) for feeding the flat conductive plate 500 in a single horizontal direction by a constant pitch with a constant interval therebetween, a first cutting apparatus 201, and a second cutting apparatus 202. The structure and operation of the cutting apparatuses 201 and 202 are basically the same as those of the cutting apparatus in the fourth embodiment.

The first cutting apparatus 201 is constituted of a lower guide 211 (or die) and an upper guide 221 as a mold group disposed vertically astride a space through which the conductive plate 500 passes, a holding mold 231 for holding the workpiece after cutting, and a cutter 241 as a cutting mold disposed over the holding mold 231. The foregoing portion 500a of the conductive plate 500 is cut by the first cutting apparatus 201 at cutting line B shown in FIG. 45 in a manner as well as in the fourth embodiment. The second cutting apparatus 202 is constituted of a lower guide 212 (or die)

and an upper guide 222 as a mold group disposed vertically astride a space through which the conductive plate 500 passes, a holding mold 232 for holding the workpiece after cutting, and a cutter 242 as a cutting mold disposed over the holding mold 232.

After the first cutting apparatus 201 cuts the plate 500 at the cutting line B, the molds 211 and 231 are moved down so as not to disturb the passage of the conductive plate 500, and the molds 221, 241, 222 and 242 are moved up to a predetermined height. It is to be noted that the molds 212 and 232 are already moved down so as not to disturb the passage of the conductive plate 500. Subsequently, the conductive plate 500 is fed by the predetermined pitch. Then, the lower guides (or die) 212 and 232 as a mold group of the second cutting apparatus 202 are moved up to the predetermined position; the upper guide 222 is then moved down to clamp the conductive plate 500; and the cutter 242 is subsequently moved down and cuts the plate at cutting line A.

The molds 212 and 232 are moved down, and the molds 222 and 242 are moved up. The conductive plate 500 then goes back to the predetermined position. At this time, the conductive plate 500 is cut at cutting line B in the same procedure as in the second embodiment. When those steps are repeated, the upper layer coil elements 4 can be continuously produced by the cutter.

[Seventh embodiment]

Although in the third to sixth embodiments, the upper layer coil elements 4 and the lower layer coil elements 5 are formed of a plate material, those elements are formed from a rectangular bar in this embodiment. A manufacturing process for the lower layer coil elements 5 is as follows.

Figure 47A:
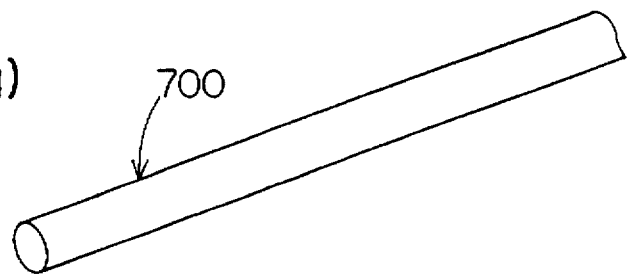
FIGS. 47(a) to 47(c) are perspective views showing a material for a lower layer coil elements, the material formed into a rectangular bar, and the material from which outer portions are removed partially, respectively.
Figure 47B:
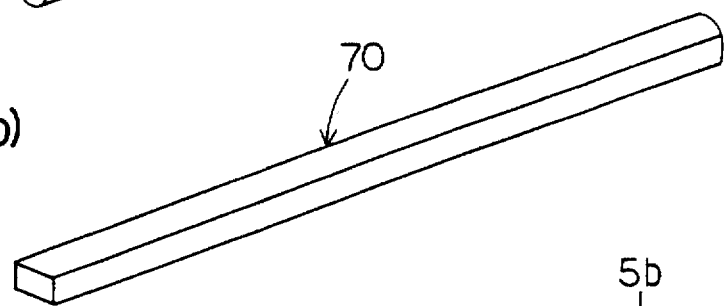

A round bar 700 having a disc shaped cross section as shown in FIG. 47(a) is prepared; the round bar 700 is sent for a flattening process of warps not shown, at which the round bar 700 with warp or curving is flattened by compulsively being passed through a roller pair disposed vertically. The flattened round bar 700 is, as shown in FIG. 47(b), transformed into a rectangular bar 70 having a rectangular cross section and a necessary length to form the extended bodies of the plural lower layer coil elements 5.

Figure 47C:
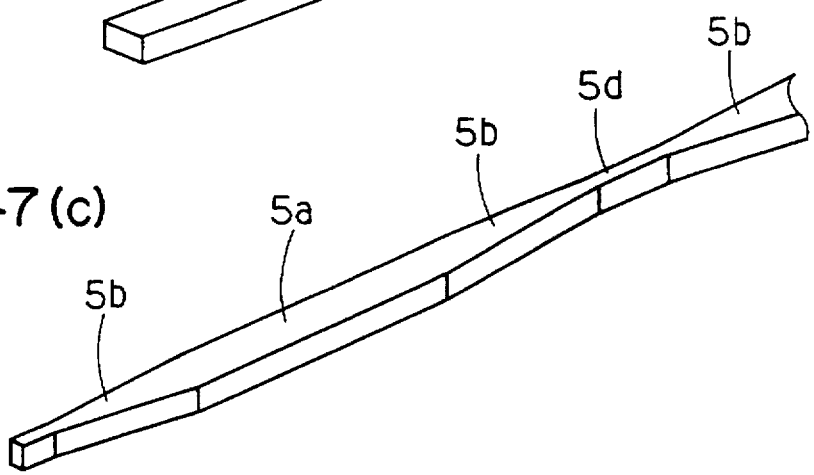

To form the extended shape of the lower layer coil element 5, a part of the outer periphery of the rectangular bar 70 is plastically deformed by a roller at every predetermined interval in the axial or longitudinal direction of the bar to reduce the cross section. Otherwise, both sides of the rectangular bar 70 are removed by a removing process, such as pressing, punching off, shaving, or the like, to reduce the cross section of the bar. Such a reduction process of the cross section provides narrow bridge portions 5d, as shown in FIG. 47(c).

Figure 48:
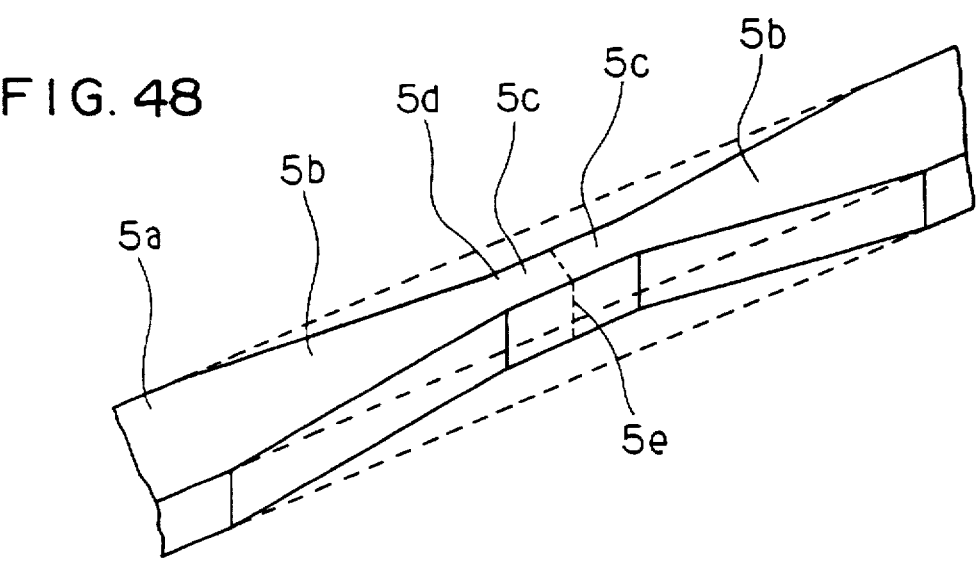
FIG. 48 is an enlarged fragmentary perspective view showing the material in FIG. 47(c)
Figure 49A:
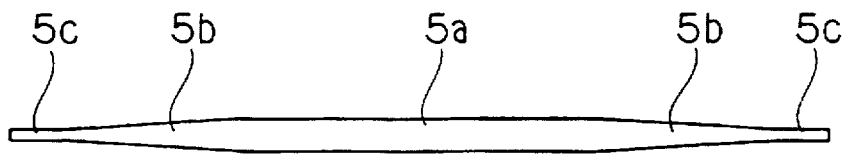
FIGS. 49(a) to 49(e) are plan views showing the lower layer coil element during the bending process in series.
Figure 49B:
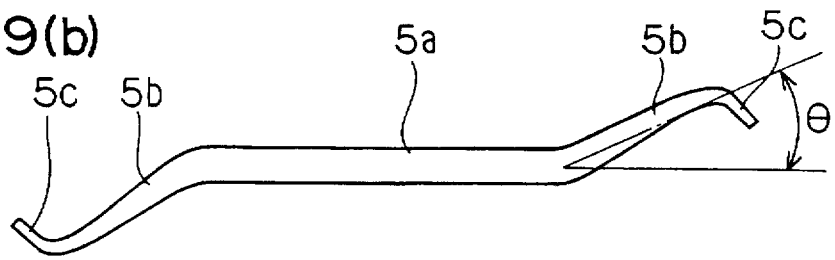

As shown in FIG. 48, the narrow portion 5d is cut at around a center portion 5e to form the connector 5c for each extended body; as shown in FIG. 49(a), the extended body of the lower layer coil element is formed. Although in this embodiment the round bar 700 is transformed into the rectangular bar 70, the rectangular bar 70 can be prepared from the beginning.

The extended body of the lower layer coil element 5 in the predetermined shape as shown in FIG. 49(a) is bent as shown in FIG. 49 (b) by the angle θ with respect to the lower layer coil side 5a at the portions of the lower layer coil ends 5b of the extended body. Then, the connectors 5c are formed by further bending the extended body by a predetermined angle with respect to the bent lower layer coil ends 5b.

Figure 49C:
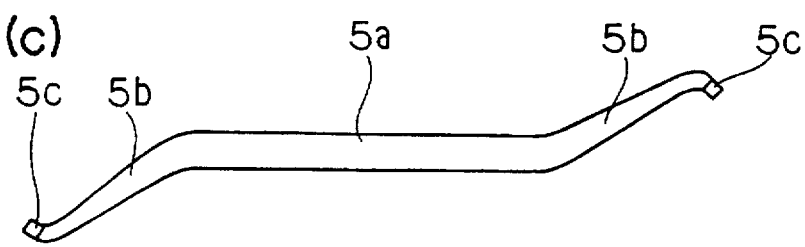
Figure 49D:
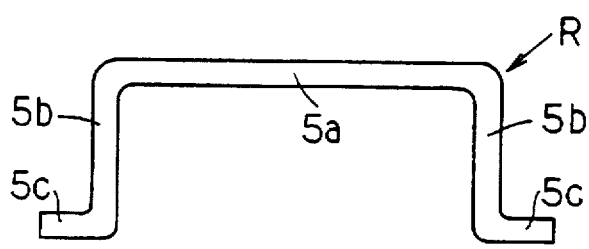
Figure 49E:
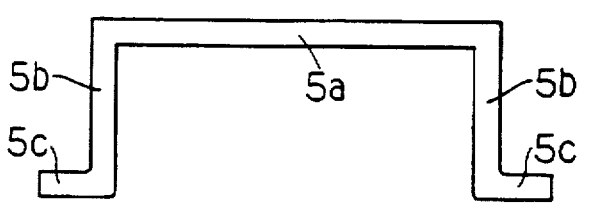

As shown in FIG. 49(c), the connectors 5c of the extended body are bent by about ninety degrees. Then, the lower layer coil ends 5b of the extended body are bent by about ninety degrees as shown in FIG. 49(d), or is subjected to the bending process. By the bending process only, however, the round corners R between the lower layer coil side 5a and the lower layer coil ends 5b may be formed with a large curvature. To precisely form the shape as shown in FIG. 49(e), the lower layer coil ends 5b may be pushed as shown in FIG. 24 in a direction of the lower layer coil side 5a (the direction of arrow 164 in FIG. 24), thereby solving the problem of the large curvature.

Although in this embodiment the portions of the lower layer coil ends 5b of the extended body are bent by the angle θ with respect to the lower layer coil side 5a after the process in FIG. 49(a), the portions can be bent in the circumferential direction around the lower layer coil side 5a as the center at a time of the process shown in FIG. 49(d). It is to be noted that as shown in FIG. 49(d), to make easy bending of the extended body at the lower layer coil ends 5b by about ninety degrees, the thickness of the connections between the lower layer coil side 5a and the lower layer coil ends 5b can be reduced. The reduced thickness prevents the connections from having a large curvature and allows the lower layer coil elements 5 to be formed precisely.

According to this method, the lower layer coil elements 5 are formed from the rectangular bar 70, so that this method can improve the yield significantly. It is to be noted that the upper layer coil elements 4 can be formed by the substantially same steps of the lower layer coil elements 5.

[Eighth Embodiment]

Figure 50:
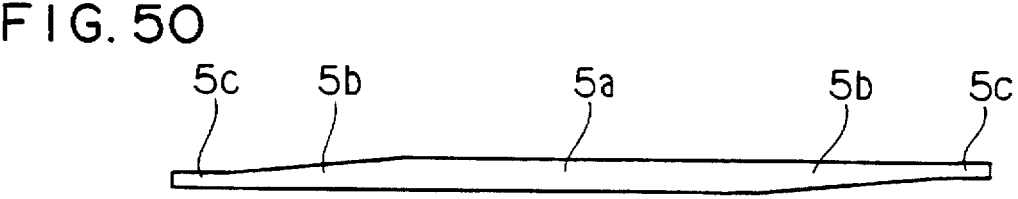
FIG. 50 is a view showing the extended lower layer coil element according to the eighth embodiment.

Although in the seventh embodiment the extended body is formed in a shape that both sides of the rectangular bar 70 are removed at portions corresponding to the lower layer coil ends 5b (the conductive portions) of the lower layer coil element 5 as shown in FIG. 49(a), in this embodiment the shape is formed by the same steps as of the seventh embodiment on one side of the bar as shown in FIG. 50. The following steps are the same as in the seventh embodiment, so that the detailed description is omitted.

[Modifications]

Although in the embodiments above, the upper layer coil ends 4b and the lower layer coil ends 5b are previously bent by the angle θ in the extended condition thereof, the upper layer coil ends 4b and the lower layer coil ends 5b can be bent by the predetermined angle θ in the circumferential direction after the portions a predetermined distance away from the tips of both coil elements 4 and 5 are bent by about the right angle. In this case, hardening can be prevented by shifting the position for bending from the position for twisting of the upper layer coil elements 4 and the lower layer coil elements 5.

The foregoing description of preferred embodiments of the invention has been presented for purposes of illustration and description, and is not intended to be exhaustive or to limit the invention to the precise form disclosed. The description was selected to best explain the principles of the invention and their practical application to enable those skilled in the art to best utilize the invention in various embodiments and various modifications as are suited to the particular use contemplated. It is intended that the scope of the invention not be limited by the specification, but be defined by the claims set forth below.

What is claimed is:

1. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core;

providing a plurality of lower layer coil elements, each of said plurality of lower layer coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core;

arranging at least one of the plurality of upper layer coil elements and at least one of the plurality of lower layer coil elements radially outside each of the plurality of slots so that the coil elements are disposed circumferentially around the armature core at the plurality of slots; and simultaneously moving all of the coil elements radially inwardly toward the armature core until each of the plurality of coil sides is inserted into a corresponding one of the plurality of slots.

2. The manufacturing method according to claim 1, further comprising the steps of:

attaching an inner disc insulator onto an axial end of the armature core before the lower layer coil elements are inserted into the corresponding one of the plurality of slots; and attaching an outer disc insulator onto the lower layer coil ends in an axial direction of the armature core after the lower layer coil elements are inserted and before the upper layer coil elements are inserted.

3. The manufacturing method according to claim 1, further comprising the steps of:

disposing a lower slot inner insulator having a U-shaped cross section into each of the slots;

disposing an upper slot inner insulator having a U-shaped cross section between each of the lower layer coil elements and the upper layer coil elements;

narrowing a slot opening of each of the slots by plastically deforming toward the slot openings projections for narrowing the slot openings located in the proximity of the slots of the armature core; and bending a top of each of the upper slot inner insulators for shutting each of the slot openings.

4. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core, each of the upper layer coil ends having a connector extending from a tip of the upper layer coil end;

providing a plurality of lower layer coil elements, each of said plurality of lower coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core, each of the lower layer coil ends having a connector extending from a tip of the lower layer coil end;

inserting at least one of the lower layer coil sides of the lower layer coil elements and at least one of the upper layer coil sides of the upper layer coil elements into each of the plurality of slots in a radial direction of the armature core; and coupling the connector of each upper layer coil end of the upper layer coil elements with the connector of each lower layer coil end of the lower layer coil elements such that each upper layer coil end corresponding to one of the slots is coupled with a lower layer coil end of a lower layer coil element of a different slot, wherein the coil elements are provided by the steps of:

punching predetermined forms for the lower layer coil elements and the upper layer coil elements out of a plate material, respectively, each of said predetermined forms having tips at ends of the predetermined forms;

bending the tips of each of the punched forms at a substantially right angle to form the connectors; and bending each of the punched forms at positions located at a predetermined distance away from the tips at a substantially right angle to form the lower layer coil ends and the upper layer coil ends before or after the step of bending to form the connectors, wherein the step of bending the tips to form connectors comprises the steps of:

providing upper and lower molds for clamping the punched forms such that tips of the punched forms remain unclamped;

providing a bending mold movable relative to the upper and lower molds in a thickness direction of the coil element with respect to the upper and lower molds such that the bending mold is in slidable contact with an outer periphery of one of the upper and lower molds;

setting a clearance between an outer end surface of the other of the upper and lower molds and the bending mold such that the clearance is less than a thickness of the plate material; and bending the tips of the coil elements by moving the bending mold relative to the upper and lower molds and squeezing the tips to have a predetermined thickness.

5. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core, each of the upper layer coil ends having a connector extending from a tip of the upper layer coil end;

providing a plurality of lower layer coil elements, each of said plurality of lower coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core, each of the lower layer coil ends having a connector extending from a tip of the lower layer coil end;

inserting at least one of the lower layer coil sides of the lower layer coil elements and at least one of the upper layer coil sides of the upper layer coil elements into each of the plurality of slots in a radial direction of the armature core; and coupling the connector of each upper layer coil end of the upper layer coil elements with the connector of each lower layer coil end of the lower layer coil elements such that each upper layer coil end corresponding to one of the slots is coupled with a lower layer coil end of a lower layer coil element of a different slot, wherein the connectors are provided by the steps of:

providing punched forms for each of said plurality of coil elements, each of said punched forms having tips at the ends of the punched forms;

providing upper and lower molds for clamping the punched forms such that the tips of the punched forms remain unclamped;

providing a bending mold movable relative to the upper and lower molds in a thickness direction of the coil element with respect to the upper and lower molds such that the bending mold is in slidable contact with an outer periphery of one of the upper and lower molds;

setting a clearance between an outer end surface of the other of the upper and lower molds and the bending mold such that the clearance is less than a thickness of the plate material; and bending the tips of the coil elements by moving the bending mold relative to the upper and lower molds and squeezing the tips to have a predetermined thickness.

6. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core, each of the upper layer coil ends having a connector extending from a tip of the upper layer coil end;

providing a plurality of lower layer coil elements, each of said plurality of lower coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core, each of the lower layer coil ends having a connector extending from a tip of the lower layer coil end;

inserting at least one of the lower layer coil sides of the lower layer coil elements and at least one of the upper layer coil sides of the upper layer coil elements into each of the plurality of slots in a radial direction of the armature core; and coupling the connector of each upper layer coil end of the upper layer coil elements with the connector of each lower layer coil end of the lower layer coil elements such that each upper layer coil end corresponding to one of the slots is coupled with a lower layer coil end of a lower layer coil element of a different slot, wherein the coil elements are provided by the steps of:

punching predetermined forms for the lower layer coil elements and the upper layer coil elements out of a plate material, respectively, each of said predetermined forms having tips at ends of the predetermined forms;

bending the tips of each of the punched forms at a substantially right angle to form the connectors; and bending each of the punched forms at positions located at a predetermined distance away from the tips at a substantially right angle to form the lower layer coil ends and the upper layer coil ends before or after the step of bending to form the connectors, wherein the step for forming the lower layer coil ends or the upper layer coil ends includes the steps of:

providing upper and lower molds for clamping center portions of the punched forms such that portions of the punched forms which form the ends remain unclamped;

providing a bending mold movable relative to the upper and lower molds in a thickness direction of the coil element with respect to the upper and lower molds such that the bending mold is in slidable contact with an outer periphery of one of the upper and lower molds; and bending the portions to be ends by relatively moving the bending mold.

7. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core, each of the upper layer coil ends having a connector extending from a tip of the upper layer coil end;

providing a plurality of lower layer coil elements, each of said plurality of lower coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core, each of the lower layer coil ends having a connector extending from a tip of the lower layer coil end;

inserting at least one of the lower layer coil sides of the lower layer coil elements and at least one of the upper layer coil sides of the upper layer coil elements into each of the plurality of slots in a radial direction of the armature core; and coupling the connector of each upper layer coil end of the upper layer coil elements with the connector of each lower layer coil end of the lower layer coil elements such that each upper layer coil end corresponding to one of the slots is coupled with a lower layer coil end of a lower layer coil element of a different slot, wherein the coil elements are provided by the steps of:

punching predetermined forms for the lower layer coil elements and the upper layer coil elements out of a plate material, respectively, each of said predetermined forms having tips at ends of the predetermined forms;

bending the tips of each of the punched forms at a substantially right angle to form the connectors; and bending each of the punched forms at positions located at a predetermined distance away from the tips at a substantially right angle to form the lower layer coil ends and the upper layer coil ends before or after the step of bending to form the connectors, wherein the step for forming the lower layer coil ends or the upper layer coil ends includes the steps of:

providing upper and lower molds for clamping center portions of the punched forms such that portions of the punched forms which form the ends remain unclamped;

providing a bending mold movable relative to the upper and lower molds in a thickness direction of the coil element with respect to the upper and lower molds such that the bending mold is in slidable contact with an outer periphery of one of the upper and lower molds; and bending the portions to be ends by relatively moving the bending mold, wherein the predetermined forms are formed by:

punching off a plurality of adjacent predetermined forms from the plate material, such that each predetermined form is connected to the adjacent predetermined form by a connecting portion of the plate material, for holding a distance between the predetermined forms; and cutting off the connecting portions from the predetermined forms before or after the tips are bent.

8. A manufacturing method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core, each of the upper layer coil ends having a connector extending from a tip of the upper layer coil end;

providing a plurality of lower layer coil elements, each of said plurality of lower coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core, each of the lower layer coil ends having a connector extending from a tip of the lower layer coil end;

inserting at least one of the lower layer coil sides of the lower layer coil elements and at least one of the upper layer coil sides of the upper layer coil elements into each of the plurality of slots in a radial direction of the armature core; and coupling the connector of each upper layer coil end of the upper layer coil elements with the connector of each lower layer coil end of the lower layer coil elements such that each upper layer coil end corresponding to one of the slots is coupled with a lower layer coil end of a lower layer coil element of a different slot, wherein the coil elements are provided by the steps of:

providing a rectangular bar having a predetermined length required to form a plurality of extended bodies of the coil conductor forming the upper layer coil elements or the lower layer coil elements;

forming a narrow portion at an outer periphery of the rectangular bar at every predetermined interval in an axial direction of the rectangular bar;

cutting about a center of the narrow portion to form plural extended bodies; and forming the upper layer coil ends or the lower layer coil ends by bending both ends of the respective extended bodies.

9. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core;

providing a plurality of lower layer coil elements, each of said plurality of lower layer coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core;

moving one of the coil elements radially inwardly toward the armature core until the coil side thereof is inserted into a corresponding one of the plurality of slots; and moving radially inwardly toward the armature core another one of the coil elements which is to be inserted into another corresponding one of the plurality of slots, while pivoting the coil ends thereof about the coil side thereof so that the coil ends thereof do not contact the coil ends of the coil element previously inserted.

10. The manufacturing method according to claim 1, 8, or 9, wherein the lower layer coil ends and the upper layer coil ends are connected by the steps of:

disposing a tip of a welding torch of a welder adjacent to regions to be welded of both connectors of the coil ends;

welding the regions to be welded by the welding torch while both coil elements in a proximity of the welding torch are grounded;

rotating the armature core by a predetermined angle after welding is completed; and repeating sequentially the disposing, welding and rotating processes.

11. The manufacturing method according to claim 10, wherein the coupling step further includes the step of:

cooling the coil elements by cooling means for cooling the coil elements, said cooling means being in contact with the lower layer coil element and the upper layer coil element adjacent to the region to be welded, except for the region to be welded.

12. The manufacturing method according to claim 8, further comprising the steps of:

preparing a pressing body movable in an axial direction having a flat pressing surface radially extended located so as to face to the outer ends of the upper layer coil ends; and smoothing the surface of the upper layer coil ends by pressing the pressing surface of the pressing body onto the outer ends of the upper layer coil ends.

13. The manufacturing method according to claim 8, wherein the coupling step of the connectors of the upper and lower layer coil ends includes the steps of:

forming a solidified resin portion between the upper layer coil ends by applying a liquid resin to the upper layer coil ends and allowing the liquid resin to solidify; and removing a portion of the solidified resin portion between pairs of adjacent upper layer coil ends.

14. The manufacturing method according to claim 8, further comprising the steps of:

disposing at least one of the lower layer coil elements or the upper layer coil elements adjacent to each of the slots formed on the armature core; and pushing the adjacently disposed coil elements into the slots at the same time.

15. The manufacturing method according to claim 8, further comprising the step of:

sequentially disposing one of the lower layer coil or the upper layer coil elements adjacent to one of the slot openings, inserting the adjacently disposed coil element into the corresponding slot, rotating the armature core by a predetermined angle before insertion of another coil element, and sequentially repeating the disposing, inserting and rotating steps until each slot houses a coil element.

16. The manufacturing method according to claim 10, further comprising the step of:

shaping a round bar into the rectangular bar.

17. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core, each of the upper layer coil ends having a connector extending from a tip of the upper layer coil end;

providing a plurality of lower layer coil elements, each of said plurality of lower coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core, each of the lower layer coil ends having a connector extending from a tip of the lower layer coil end;

inserting at least one of the lower layer coil sides of the lower layer coil elements and at least one of the upper layer coil sides of the upper layer coil elements into each of the plurality of slots in a radial direction of the armature core;

coupling the connector of each upper layer coil end of the upper layer coil elements with the connector of each lower layer coil end of the lower layer coil elements such that each upper layer coil end corresponding to one of the slots is coupled with a lower layer coil end of a lower layer coil element of a different slot;

forming a solidified resin portion between the upper layer coil ends by applying a liquid resin on the surface of the upper layer coil ends by dropping the liquid resin from a resin dropping nozzle while rotating the armature core with the slots extending substantially vertically; and blowing air on the liquid resin from an air nozzle on the surface of the upper layer coil ends while further rotating the armature core, removing excess liquid resin.

18. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core, each of the upper layer coil ends having a connector extending from a tip of the upper layer coil end;

providing a plurality of lower layer coil elements, each of said plurality of lower coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core, each of the lower layer coil ends having a connector extending from a tip of the lower layer coil end;

inserting at least one of the lower layer coil sides of the lower layer coil elements and at least one of the upper layer coil sides of the upper layer coil elements into each of the plurality of slots in a radial direction of the armature core;

coupling the connector of each upper layer coil end of the upper layer coil elements with the connector of each lower layer coil end of the lower layer coil elements such that each upper layer coil end corresponding to one of the slots is coupled with a lower layer coil end of a lower layer coil element of a different slot;

forming a solidified resin portion between the upper layer coil ends by applying a liquid resin to the upper layer coil ends and allowing the liquid resin to solidify;

providing a rotary cutter having a blade rotating in a plane perpendicular to the radial direction of the armature core at a position facing the surface of the upper layer coil ends onto which the solidified resin portion has already been attached;

setting the rotary cutter at a groove between the pair of the upper layer coil ends adjacent to each other by relatively moving, with respect to the rotary cutter, the armature core with the solidified resin portion toward a direction closer to the rotary cutter; and removing the solidified resin portion in the groove by rotating the armature core while the rotary cutter is rotated.

19. A method for manufacturing a rotor of an electric rotary machine comprising the steps of:

providing an armature core having a plurality of slots on an outer surface thereof;

providing a plurality of upper layer coil elements, each of said plurality of upper layer coil elements having an upper layer coil side and an upper layer coil end electrically connected at each end of the upper layer coil side such that each upper layer coil end extends at a right angle from the upper layer coil side and is inclined by a predetermined angle with respect to the upper layer coil side in a circumferential direction of the armature core, each of the upper layer coil ends having a connector extending from a tip of the upper layer coil end;

providing a plurality of lower layer coil elements, each of said plurality of lower coil elements having a lower layer coil side and a lower layer coil end electrically connected at each end of the lower layer coil side such that each lower layer coil end extends at a right angle from the lower layer coil side and is inclined by a predetermined angle with respect to the lower layer coil side in a circumferential direction of the armature core, each of the lower layer coil ends having a connector extending from a tip of the lower layer coil end;

inserting at least one of the lower layer coil sides of the lower layer coil elements and at least one of the upper layer coil sides of the upper layer coil elements into each of the plurality of slots in a radial direction of the armature core; and coupling the connector of each upper layer coil end of the upper layer coil elements with the connector of each lower layer coil end of the lower layer coil elements such that each upper layer coil end corresponding to one of the slots is coupled with a lower layer coil end of a lower layer coil element of a different slot, wherein each slot has a pair of projections extending radially outwardly with a predetermined angle therebetween at the outer surface of the armature core between the slots adjacent to each other, further comprising the steps of:

providing a punch of a narrow width, disposed adjacently to the outer surface of the armature core, movable in the radial direction;

providing another punch of a wide width disposed adjacently to the outer surface of the armature core, movable in the radial direction, located at a position at an angle different from the narrow width punch;

disposing a lower slot inner insulator having a U-shaped cross section into each of the slots;

disposing an upper slot insulator having a U-shaped cross section between each of the lower layer coil elements and the upper layer coil elements;

subsequently widening a groove between the pair of the projections adjacent to each other by pushing the narrow width punch to the groove in a direction toward the center of the armature core; and narrowing the slot opening of each of the slots through a plastic deformation of the projections by pushing the wide width punch to the groove in a direction toward the center of the armature core where an end surface of the wide width punch is in contact with both projections and bending a top of each of the upper slot inner insulators for shutting each of the slot openings.

* * * * *